United States Patent [19]
Min et al.

[11] Patent Number: 5,917,645
[45] Date of Patent: Jun. 29, 1999

[54] THIN FILM ACTUATED MIRROR ARRAY IN AN OPTICAL PROJECTION SYSTEM AND METHOD FOR MANUFACTURING THE SAME

[75] Inventors: Dong-Hoon Min, Seoul; Sang-Wook Park, Kyeongki-Do, both of Rep. of Korea

[73] Assignee: Daewoo Electronics Co., Ltd., Seoul, Rep. of Korea

[21] Appl. No.: 08/988,359

[22] Filed: Dec. 10, 1997

[30] Foreign Application Priority Data

| Mar. 28, 1997 | [KR] | Rep. of Korea | P 97-11058 |
| Jun. 30, 1997 | [KR] | Rep. of Korea | P 97-29533 |
| Aug. 28, 1997 | [KR] | Rep. of Korea | 9 97-42090 |

[51] Int. Cl.$^6$ .......................... G02B 26/08; G02B 7/182; H01L 41/053
[52] U.S. Cl. .......................... 359/291; 359/224; 359/295; 359/318; 359/855; 430/321
[58] Field of Search .................... 359/212, 224, 359/290, 291, 295, 318, 850, 855; 430/321

[56] References Cited

U.S. PATENT DOCUMENTS

| 4,441,791 | 4/1984 | Hornbeck | 359/295 |
| 4,949,152 | 8/1990 | Asano et al. | 357/51 |
| 5,126,836 | 6/1992 | Um | 359/209 |
| 5,409,851 | 4/1995 | Oh | 437/41 |
| 5,469,302 | 11/1995 | Lim | 359/846 |
| 5,768,006 | 6/1998 | Min et al. | 359/291 |

FOREIGN PATENT DOCUMENTS

| 0 741 310 | 11/1996 | European Pat. Off. |
| 2 313 451 | 11/1997 | United Kingdom . |
| 2 316 757 | 3/1998 | United Kingdom . |
| 95/23552 | 8/1995 | WIPO . |
| 96/33434 | 10/1996 | WIPO . |

*Primary Examiner*—Georgia Epps
*Assistant Examiner*—Margaret Burke
*Attorney, Agent, or Firm*—Pillsbury Madison & Sutro LLP

[57] ABSTRACT

Thin film AMA in an optical projection system and a method for manufacturing the same are disclosed. The thin film AMA has a substrate having an electrical wiring for receiving a first signal applied from outside and transmitting the first signal, a first metal layer having a connecting terminal, a first passivation layer, a second metal layer, an actuator, and a reflecting member. The actuator has a supporting layer, a bottom electrode, an active layer, and a top electrode. An incident light from a light source may be excluded by means of the second metal layer formed on the first metal layer. Mis-operation of actuator due to a photo leakage current caused by an incident light can be prevented before a first signal and a second signal are respectively applied to the bottom electrode and the top electrode.

19 Claims, 21 Drawing Sheets

THIN FILM ACTUATED MIRROR ARRAY IN AN OPTICAL PROJECTION SYSTEM AND METHOD FOR MANUFACTURING THE SAME

BACKGROUND OF THE INVENTION

Field of the Invention

The present invention relates to a thin film actuated mirror array in an optical projection system and to a method for manufacturing the same, and more particularly to a thin film actuated mirror array in an optical projection system for preventing a mis-operation of an actuator due to a photo leakage current caused by an incident light, and to a method for manufacturing the same.

In general, light modulators are divided into two groups according to their optics. One type is a direct light modulator such as a cathode ray tube (CRT) and the other type is a transmissive light modulator such as a liquid crystal display (LCD). The CRT produces superior quality pictures on a screen, but the weight, the volume and the manufacturing cost of the CRT increase according to the magnification of the screen. The LCD has a simple optical structure, so the weight and the volume of the LCD are less than those of the CRT. However, the LCD has a poor light efficiency of under 1 to 2%, because the incident light has polarization. Also, there are some problems in the liquid crystal materials of the LCD such as sluggish response and overheating.

Thus, a digital mirror device (DMD) and actuated mirror arrays (AMA) have been developed to solve these problems. Now, the DMD has a light efficiency of about 5% while the AMA has a light efficiency of above 10%. The AMA enhances the contrast of a picture projected on a screen, so the picture is more apparent and brighter. The AMA is not affected by the polarization of rays of light incident. Also, the AMA does not affect the polarization of a reflected light as well. Therefore, the AMA is more efficient than the LCD or the DMD.

FIG. 1 shows a schematic diagram of an engine system of a conventional AMA disclosed in U.S. Pat. No. 5,126,836 (issued to Gregory Um). Referring to FIG. 1, light incident from a light source 1 passes through a first slit 3 and a first lens 5 and is divided into red, green, and blue lights according to the Red.Green.Blue (R.G.B) system of color representation. After the divided red, green, and blue lights are respectively reflected by a first mirror 7, a second mirror 9, and a third mirror 11, the reflected lights are respectively incident on AMA devices 13, 15 and 17 corresponding to the mirrors 7, 9 and 11. The AMA devices 13, 15 and 17 respectively tilt the mirrors installed therein, so the rays of light incident are reflected by the mirrors. In this case, the mirrors installed in the AMA devices 13, 15 and 17 are tilted according to the deformation of active layers formed under the mirrors. The rays of reflected light by the AMA devices 13, 15 and 17 pass a second lens 19 and a second slit 21 and form a picture on a screen (not shown) by means of a projection lens 23.

In most cases, ZnO is used as a material forming the active layer. However, lead zirconate titanate (PZT:Pb(Zr, Ti)$O_3$) has been found to have a better piezoelectric property than ZnO. PZT is a complete solid solution made of lead zirconate (PbZr$O_3$) and lead titanate (PbTi$O_3$). At a high temperature, PZT exists in a paraelectric phase whose crystal structure is a cubic. While at a room temperature, PZT exists in an antiferroelectric phase whose crystal structure is an orthorhombic and in a ferroelectric phase whose crystal structures are a rhombohedral or a tetragonal according to the composition ratio of Zr and Ti.

PZT has a morphotropic phase boundary (MPB) of the tetragonal phase and the rhombohedral phase where the composition ratio of Zr and Ti is 1:1. PZT has a maximum dielectric property and piezoelectric property at the MPB. The MPB does not lie in a specific composition ratio, but lies over a relatively wide region where the tetragonal phase and the rhombohedral phase coexist. The phase coexistent region of PZT is reported differently depending on researchers. Various theories such as thermodynamic stability, compositional fluctuation, and internal stress have been suggested as the reason for the phase coexistent region. Nowadays, a PZT thin film can be manufactured by various processes such as a spin coating method, a chemical vapor deposition (CVD) method, or a sputtering method.

The AMA is generally divided into a bulk type AMA and a thin film type AMA. The bulk type AMA is disclosed in U.S. Pat. No. 5,469,302 (issued to Dae-Young Lim). The bulk type AMA is formed as follows. A ceramic wafer having a multilayer ceramic where metal electrodes are inserted is mounted on an active matrix having transistors. After sawing the ceramic wafer, a mirror is mounted on the ceramic wafer. However, the bulk type AMA has some disadvantages that very accurate process and design are required, and the response of an active layer is slow. Therefore, the thin film AMA that can be manufactured by using semiconductor manufacturing technology has been developed.

The thin film AMA is disclosed at U.S. Ser. No. 08/602,928 entitled "THIN FILM ACTUATED MIRROR ARRAY FOR USE IN AN OPTICAL PROJECTION SYSTEM", which is now pending in USPTO and is subject to an obligation to the assignee of this application.

FIG. 2 shows a cross-sectional view of the thin film AMA. Referring to FIG. 2, the thin film AMA has an active matrix 60 and an actuator 90 formed on the active matrix 60. The active matrix 60 has a substrate 50 having M×N (M, N are integers) numbers of transistors (not shown) therein, M×N (M, N are integers) numbers of connecting terminals 53 respectively formed on the transistors, a passivation layer 56 formed on the substrate 50 and on the connecting terminal 53, and an etch stop layer 59 formed on the passivation layer 56.

The actuator 90 has a supporting layer 68, a first electrode 71, an active layer 74, a second electrode 77, and a via contact 80. The supporting layer 68 has a first portion attached to the etch stop layer 59 under which the connecting terminal 53 is formed. Also, the etch stop layer 59 has a second portion parallely formed above the bottom of the active matrix 60. The first portion of the supporting layer is called an anchor 68a. An air gap 65 is interposed between the second portion of the supporting layer 68 and the etch stop layer 59. The first electrode 71 is formed on the supporting layer 68, the active layer 74 is formed on the first electrode 71, and the second electrode 77 is formed on the active layer 74. The via contact 80 is formed from a portion of the active layer 74 under which the connecting terminal 53 is formed to the connecting terminal 53. The via contact 80 connects the first electrode 71 with the connecting terminal 53.

A manufacturing method of the thin film AMA will be described below.

FIGS. 3A to 3D illustrate the manufacturing steps of the thin film AMA shown in FIG. 2. In FIGS. 3A to 3D, the same reference numerals are used for the same elements in FIG. 2.

Referring to FIG. 3A, at first, a substrate 50 in which M×N number of transistors (not shown) are mounted and M×N number of connecting terminals 53 respectively formed on the transistors are provided. Subsequently, a passivation layer 56 is formed on the connecting terminal 53 and the substrate 50. The passivation layer 56 is formed by using a phosphor-silicate glass (PSG) and by a chemical vapor deposition (CVD) method so that the passivation layer 56 has a thickness of between 0.1 $\mu$m and 2.0 $\mu$m. The passivation layer 56 protects the substrate 50 having the transistors during subsequent manufacturing steps.

An active matrix 60 is completed after an etch stop layer 59 is formed on the passivation layer 59. The active matrix 60 includes the substrate 50, the connecting terminal 53, the passivation layer 56, and the etch stop layer 59. The etch stop layer 59 is formed by using nitride and by a chemical vapor deposition method so that the etch stop layer 59 has a thickness of between 1000 Å and 2000 Å. The etch stop layer 59 prevents the passivation layer 56 and the substrate 50 from etching during subsequent etching steps.

A sacrificial layer 62 is formed on the etch stop layer 59. The sacrificial layer 62 is formed by using a phosphor-silicate glass and by a chemical vapor deposition method so that the sacrificial layer 62 has a thickness of between 1.0 $\mu$m and 2.0 $\mu$m. In this case, the flatness of the surface of the sacrificial layer 62 is poor because the sacrificial layer 62 covers over the substrate 50 having the transistors. Thus, the surface of the sacrificial layer 62 is planarized by using a spin on glass (SOG) or by a chemical mechanical polishing. Subsequently, the sacrificial layer 55 is patterned to expose a portion of the etch stop layer 59 where the connecting terminal 53 is formed thereunder. An anchor 68$a$ will be formed at the exposed portion of the etch stop layer 59.

Referring to FIG. 3B, a first layer 67 is formed on the exposed portion of the etch stop layer 59 and on the sacrificial layer 62. The first layer 67 is formed by using nitride. The first layer 67 is formed by a sputtering method or a CVD method so that the first layer 67 has a thickness of between 0.1 $\mu$m and 2.0 $\mu$cm. A first electrode layer 70 is formed on the first layer 67 by using a metal such as platinum or tantalum and by a sputtering method or a CVD method so that the first electrode layer 70 has a thickness of between 0.1 $\mu$m and 1.0 $\mu$m. Next, the first electrode layer 70 is iso-cut so as to separately apply a first signal (picture current signal) to each of pixel including the first electrode layer 70.

A second layer 73 is formed on the first electrode layer 70 by using a piezoelectric material such as lead zirconate titanate (PZT) or an electrostrictive material such as lead magnesium niobate (PMN). The second layer 73 is formed by a sol-gel method, a sputtering method, or a CVD method so that the second layer 73 has a thickness of between 0.1 $\mu$m and 1.0 $\mu$m. A second electrode layer 76 is formed on the second layer 73 by using a metal such as aluminum or silver and by a sputtering method or a CVD method so that the second electrode layer 73 has a thickness of between 0.1 $\mu$m and 1.0 $\mu$m.

Referring to FIG. 3C, the second electrode layer 76, the second layer 73, and the first electrode layer 70 are respectively patterned to form a second electrode 77, an active layer 74, and a first electrode 71. Thus, M×N number of pixels having predetermined shapes are formed. At that time, a portion of the active layer 74 is exposed by etching a portion of the second electrode 77 where the connecting terminal 53 is formed thereunder. Portions of the active layer 74, the first electrode 71, the first layer 67, the etch stop layer 59, and the passivation layer 56 are etched. Subsequently, a via hole 79 is formed from the exposed portion of the active layer 74 to the connecting terminal 53.

Referring to FIG. 3D, a via contact 80 is formed in the via hole 79 by filling the via hole 79 with an electrically conductive material, for example, tungsten. The via contact 80 is formed by a sputtering method or a CVD method. The via contact 80 connects the connecting terminal 53 to the first electrode 71. The first signal transmitted from outside is applied to the first electrode 71 through the transistor, the connecting terminal 53, and the via contact 80. While, a second signal (bias current signal) transmitted from outside is applied to the second electrode 77 through a common line (not shown). Therefore, an electric field is generated between the second electrode 77 and the first electrode 71. The active layer 74 formed between the second electrode 77 and the first electrode 71 is deformed by the electric field. The active layer 74 is deformed in perpendicular direction to the electric field, so the actuator 90 including the active layer 74 is actuated upward by a predetermined angle. The second electrode 77 is also tilted upward, and the second electrode 77 reflects the incident light from the light source (not shown) by a predetermined angle.

Subsequently, the first layer 69 is patterned to form a supporting layer 68 for supporting the actuator 90. A portion of the supporting layer 68 is attached to the etch stop layer 59 where the connecting terminal 53 is formed thereunder. The attached portion of the supporting layer 68 is called an anchor 68$a$. After the sacrificial layer 62 is removed by using a hydrogen fluoride vapor, pixels are rinsed and dried to complete the thin film AMA.

However, in the above-described thin film AMA, the light incident from a light source is projected to the second electrode 77 as well as the other area except the second electrode 77. Thus, a photo leakage current caused by the incident light flows through the active matrix 60. Due to the photo leakage current, the actuator 90 is mis-operated before the first signal is applied or during the actuator 90 is actuated.

SUMMARY OF THE INVENTION

Accordingly, the present invention is contrived to solve the foregoing problems. An object of the present invention is to provide a thin film actuated mirror array in an optical projection system for preventing a mis-operation of an actuator due to a photo leakage current caused by an incident light, and to a method for manufacturing the same.

Also, it is a second object of the present invention to provide a method for manufacturing the above thin film actuated mirror array in an optical projection system.

To accomplish the above first object, there is provided in the present invention a thin film actuated mirror array comprising a substrate, a first metal layer formed on the substrate, a first passivation layer formed on the electrical wiring and on the first metal layer, a second metal layer formed on the first passivation layer, an actuator, and a reflecting member. The substrate has an electrical wiring for receiving a first signal from outside and transmitting the first signal. The first metal has a connecting terminal connected to the electrical wiring, thereby transmitting the first signal. The first passivation layer protects the substrate having the electrical wiring and the connecting terminal. The second metal layer prevents a photo leakage current caused by a light incident from a light source. The actuator comprises a supporting layer formed on the second metal layer, a bottom electrode formed on the first layer for receiving the first signal, a top electrode corresponding to the bottom electrode for receiving the second signal and generating an electric field between the top electrode and the bottom electrode, and an active layer formed between the top electrode and the bottom electrode and deformed by the electric field. Also, the actuator comprises a common line for applying the second signal to the top electrode. The common line is formed on a portion of the actuator and connected to the top electrode.

A second passivation layer may be formed on the second metal layer for protecting the second metal layer. An etch stop layer is formed on the second passivation layer for protecting the second passivation layer. The second passivation layer may be formed by using a phosphor-silicate glass and the etch stop layer may be formed by using a nitride. The common line may be formed by using an electrically conductive metal.

Preferably, the second metal layer further has a first adhesion layer formed on the first passivation layer and a first barrier layer formed on the first adhesion layer. The first adhesion layer is formed by using titanium and the first barrier layer is formed by using titanium nitride. A first opening is formed in a portion of the second metal layer under which the connecting terminal is formed.

A third metal layer may be formed on the second metal layer for preventing a photo leakage current caused by the light incident from the light source. A third passivation layer can be formed on the third metal layer for protecting the third metal layer. Preferably, the third metal layer further has a second adhesion layer formed on the second metal layer and a second barrier layer formed on the second adhesion layer. The second adhesion layer may be formed by using titanium and the second barrier layer may be formed by using titanium nitride. A second opening is formed in a portion of the third metal layer under which the connecting terminal is formed.

To accomplish the above second object, there is provided in the present invention a method for manufacturing a thin film actuated mirror array comprising the steps of:

providing a substrate having an electrical wiring for receiving the first signal from outside and transmitting the first signal;

forming a first metal layer on the substrate, the first metal layer having a connecting terminal connected to the electrical wiring for transmitting the first signal;

forming a first passivation layer on the electrical wiring and on the first metal layer, the first passivation layer protecting the substrate having the electrical wiring and the connecting terminal;

forming a second metal layer on the first passivation layer for preventing a photo leakage current caused by an incident light;

forming a second passivation layer on the second metal layer for protecting the second metal layer;

forming a first layer on the second passivation layer;

forming a bottom electrode layer on the first layer and patterning the bottom electrode layer to form a bottom electrode for receiving the first signal;

forming a second layer and a top electrode layer on the bottom electrode;

forming an actuator by patterning the top electrode layer to form a top electrode for receiving the second signal and generating an electric field, by patterning the second layer to form an active layer deformed by the electric field, and by patterning the first layer to form a supporting layer beneath the bottom electrode; and forming a reflecting member for reflecting a light on the top electrode of the actuator.

Preferably, the step of forming the second metal layer further comprises the steps of forming a first adhesion layer on the first passivation layer by using titanium and by member of a sputtering method and forming a first barrier layer on the first adhesion layer by using titanium nitride and by member of a physical vapor deposition method. Also, the step of forming the second metal layer further comprises the step of forming an opening by etching a portion of the second metal layer under which the connecting terminal is formed.

Therefore, in the thin film actuated mirror array in an optical projection system according to the present invention, a light incident from a light source can be excluded by member of the second metal layer. Therefore, before a first signal and a second signal are respectively applied to the bottom electrode and the top electrode, a mis-operation of an actuator due to a photo leakage current caused by the light incident from the light source can be prevented.

BRIEF DESCRIPTION OF THE DRAWINGS

The other object, character and advantages of the present invention will become more apparent by describing in detail preferred embodiments thereof with reference to the attached drawings in which.

DETAILED DESCRIPTION OF THE INVENTION

Hereinafter, the preferred embodiments of the present invention will be explained in more detail with reference to the accompanying drawings.

Embodiment 1

Figure 1:
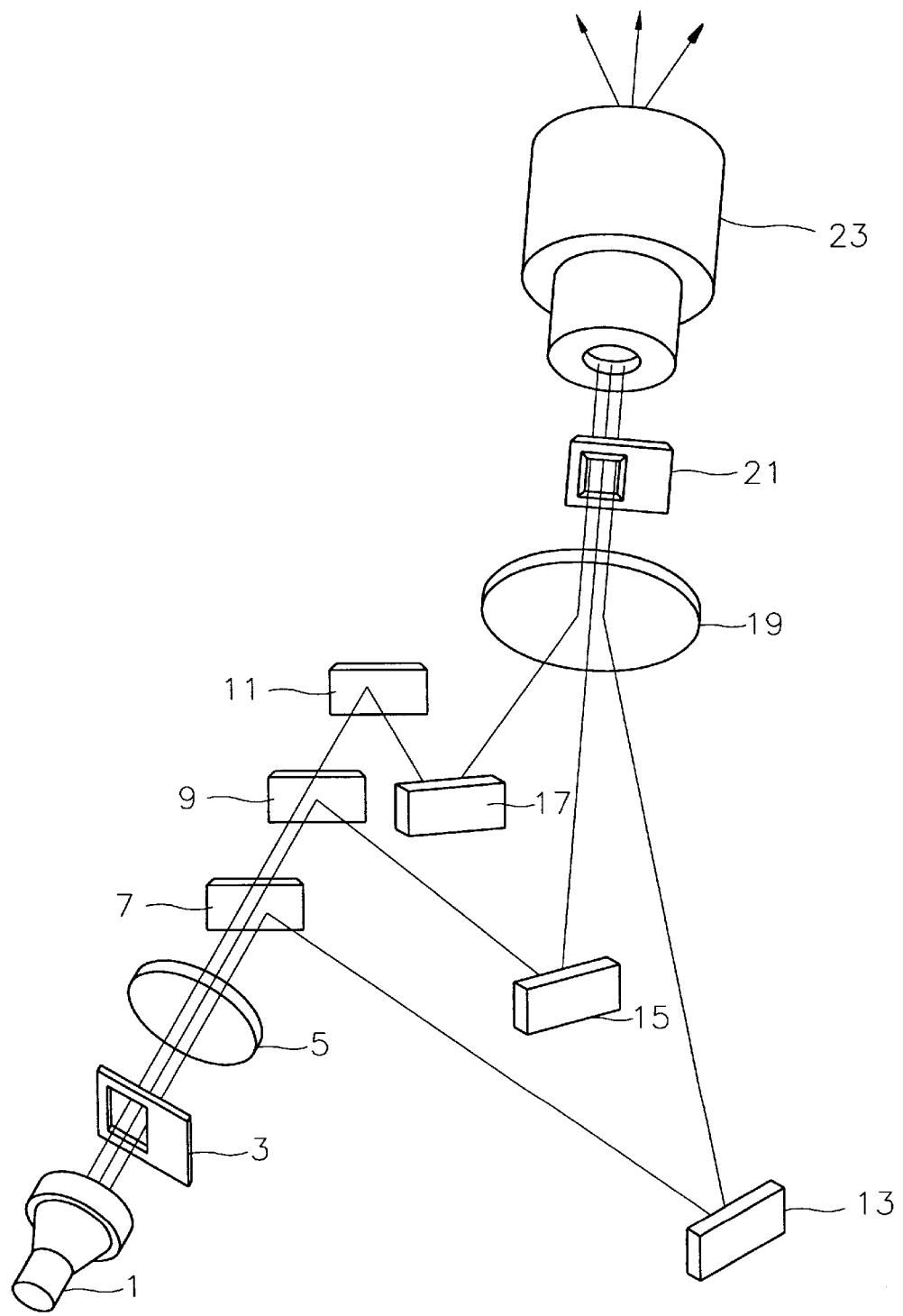
FIG. 1 is a schematic view for showing an engine system of a conventional actuated mirror array.
Figure 2:
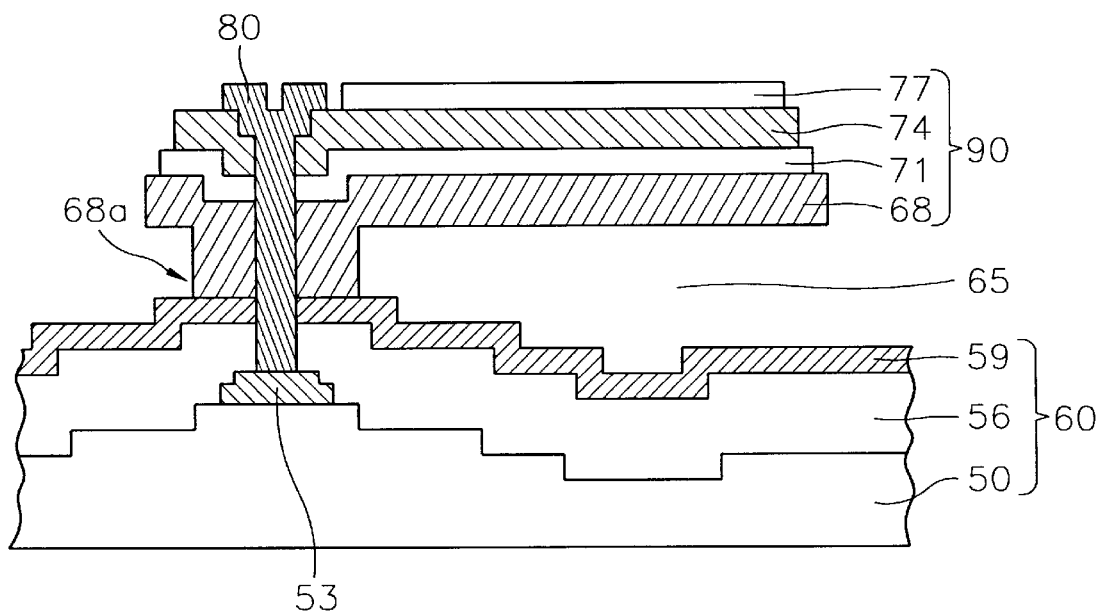
FIG. 2 is a cross-sectional view for showing a thin film actuated mirror array in an optical projection system disclosed in a prior application of the assignee of this application.
Figure 3A:
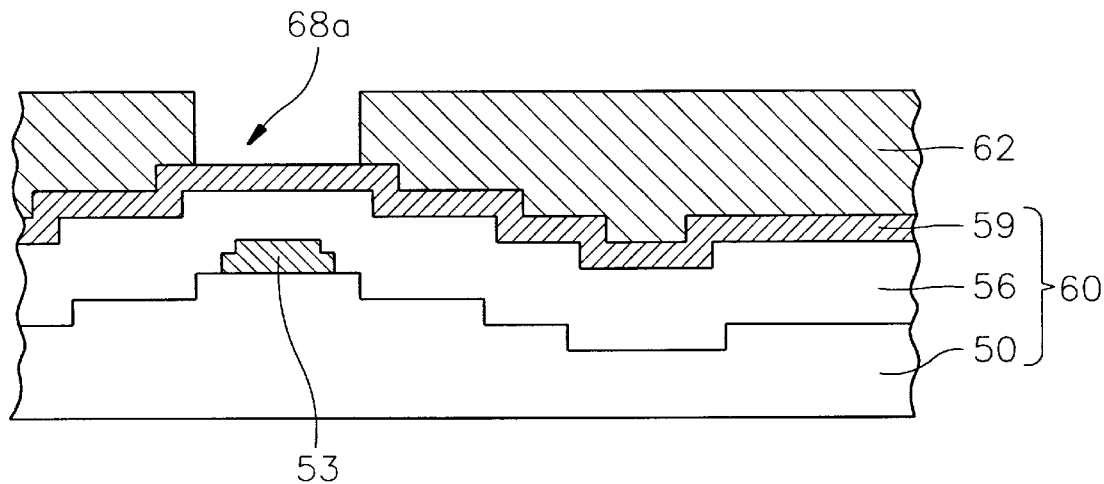
FIGS. 3A to 3D illustrate the manufacturing steps of the thin film actuated mirror array in an optical projection system illustrated in FIG. 2.
Figure 3B:
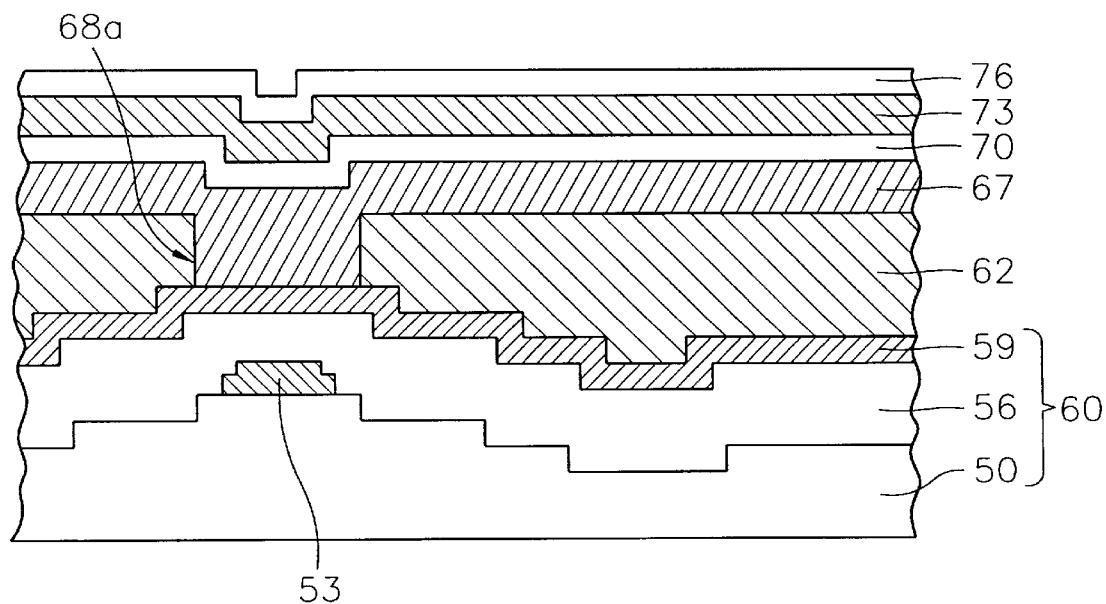
Figure 3C:
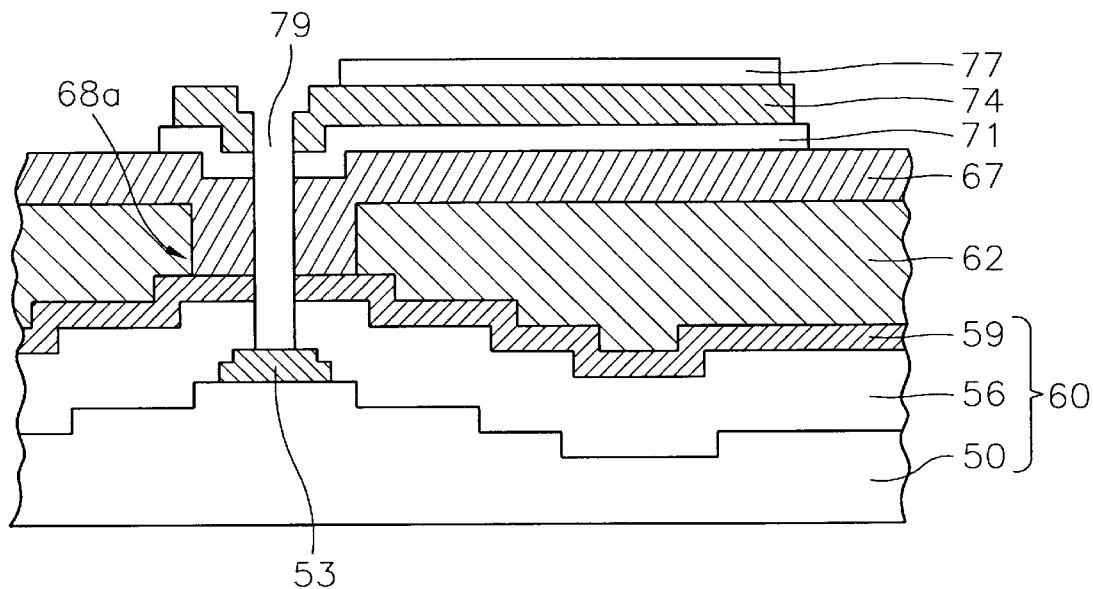
Figure 3D:
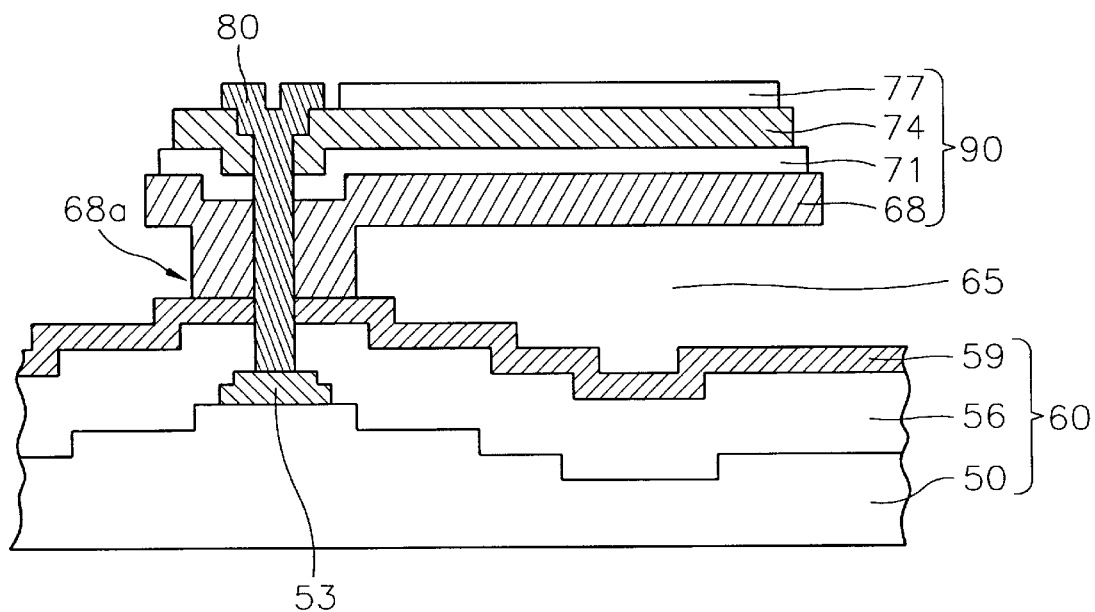
Figure 4:
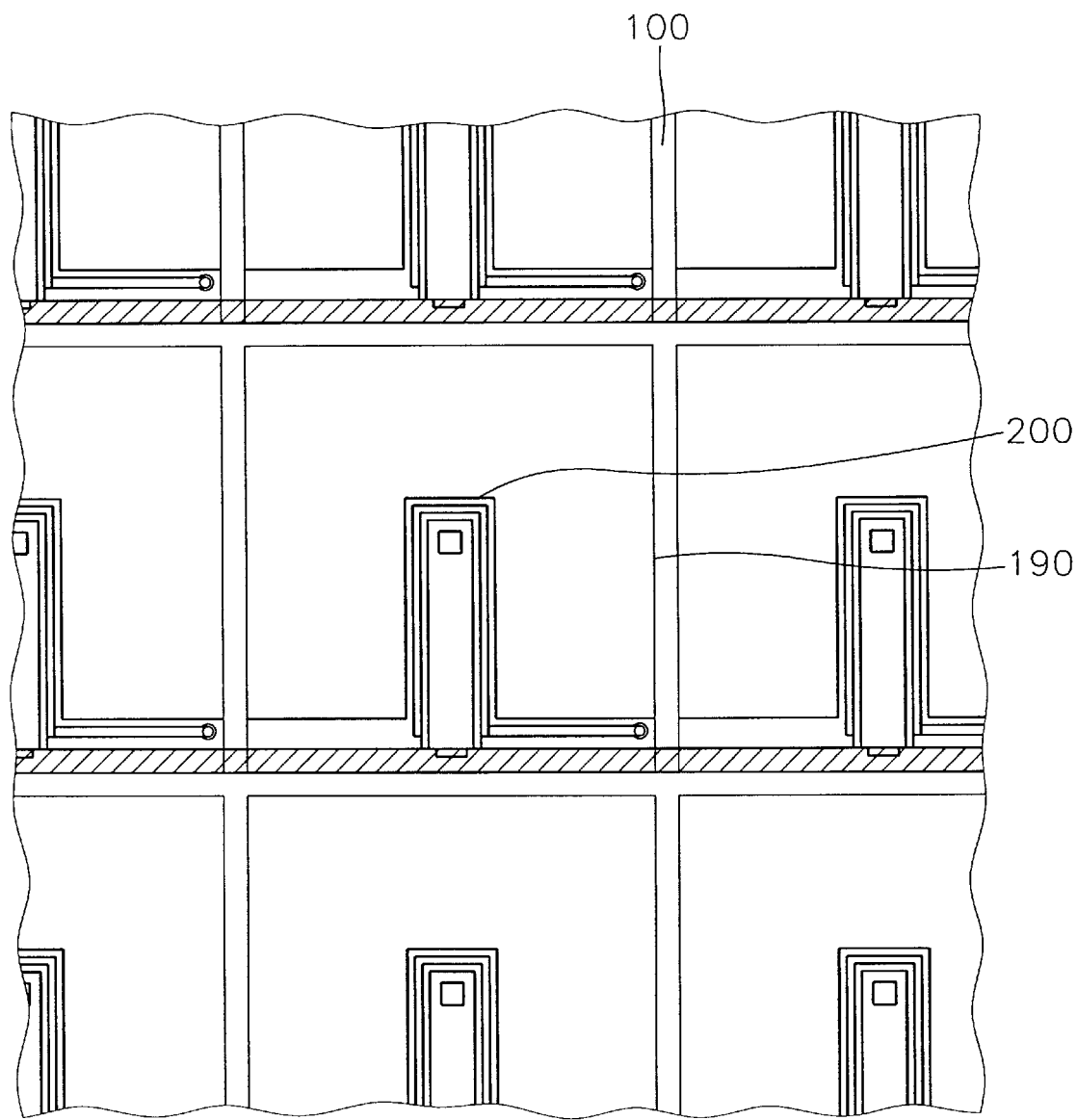
FIG. 4 is a plan view for showing a thin film actuated mirror array in accordance with the first embodiment of the present invention.
Figure 5:
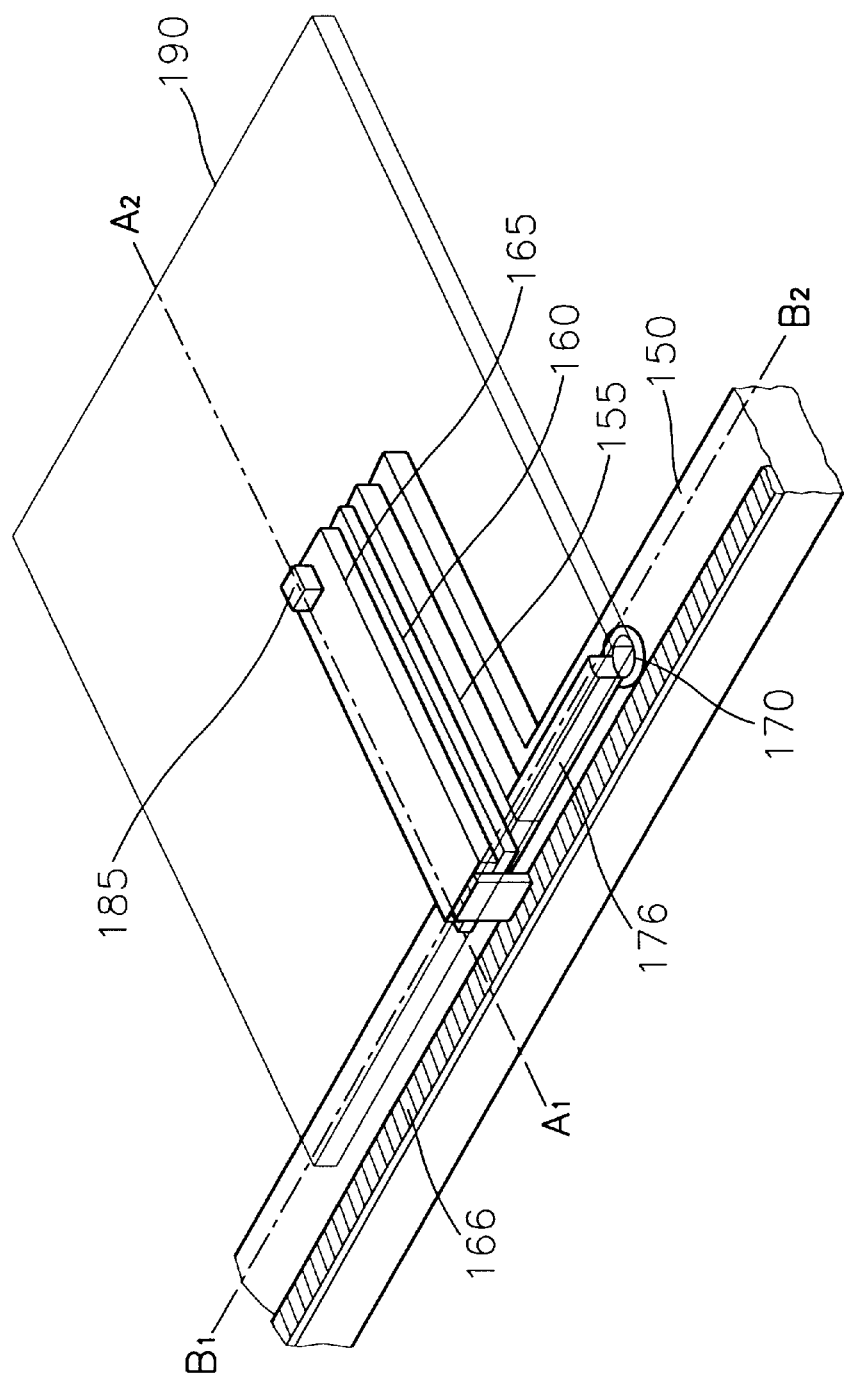
FIG. 5 is a perspective view for showing the thin film actuated mirror array in an optical projection system in FIG. 4.
Figure 6:
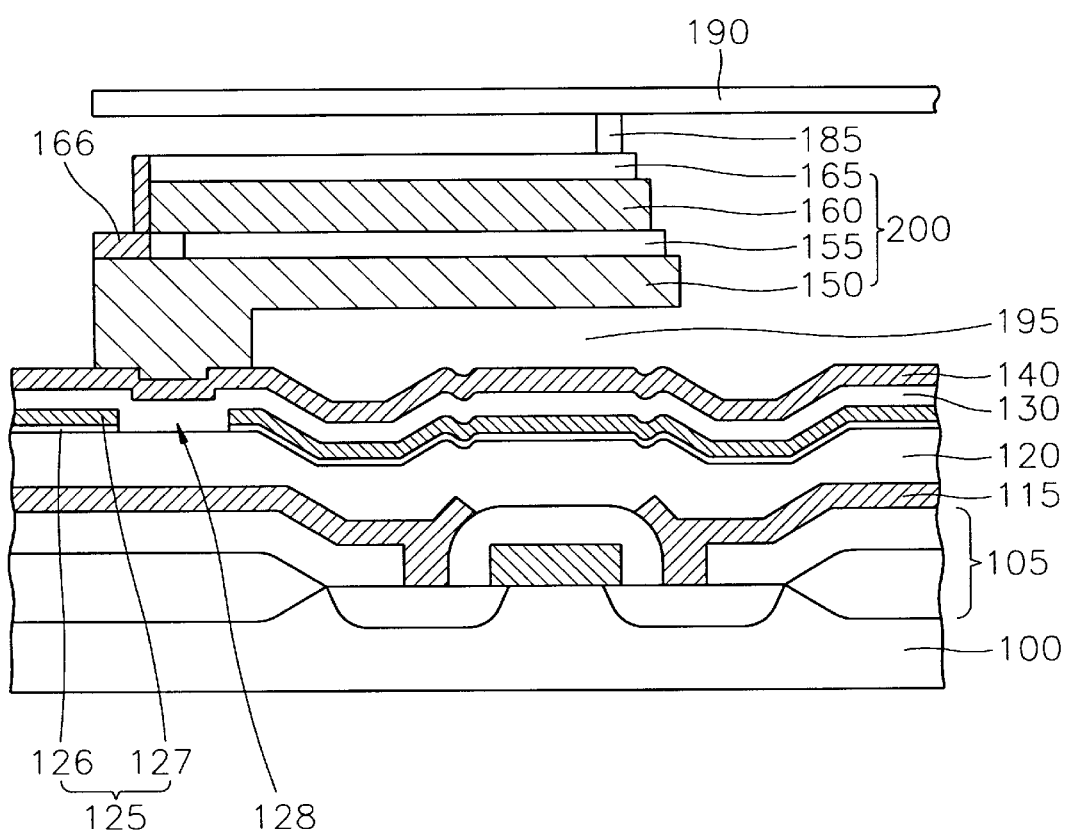
FIG. 6 is a cross-sectional view taken along the line $A_{1-A2}$ of FIG. 5.
Figure 7:
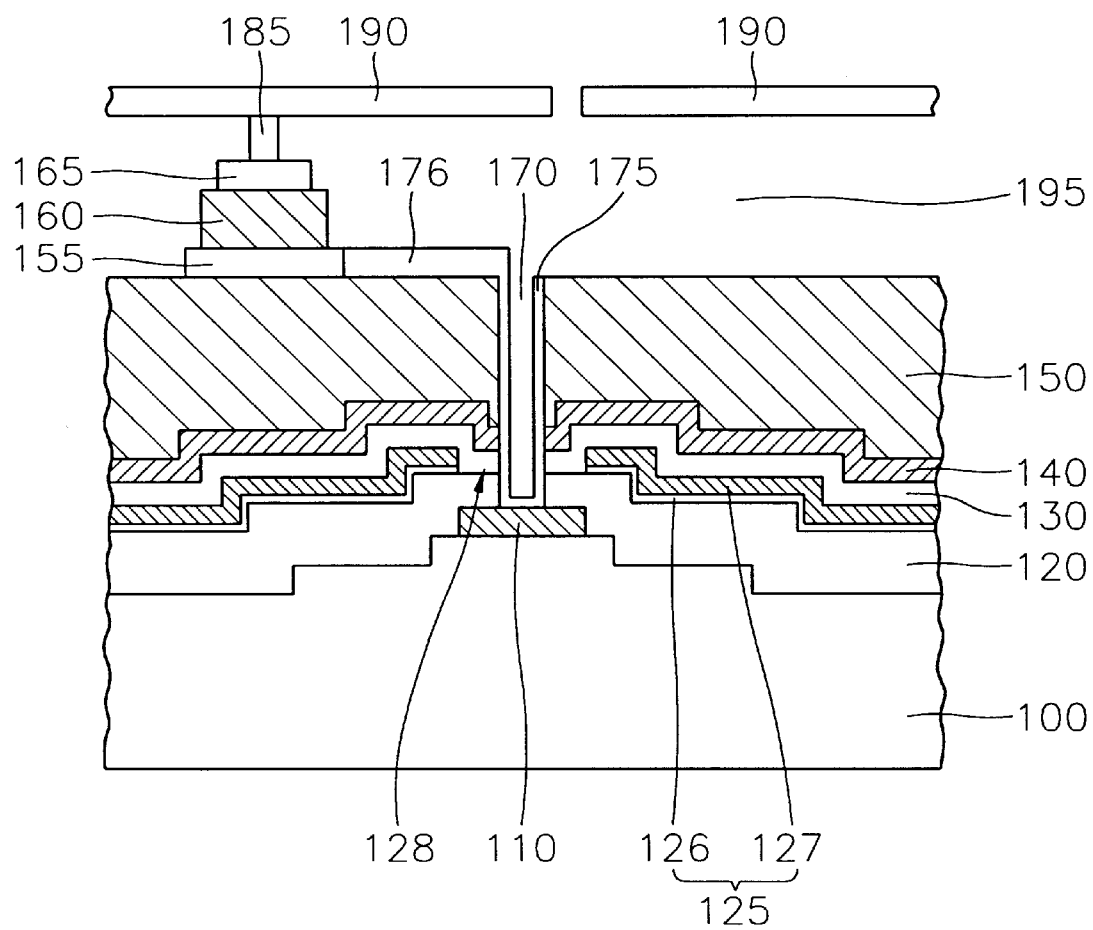
FIG. 7 is a cross-sectional view taken along the line $B_{1-B2}$ of FIG. 5.

FIG. 4 is a plan view for showing a thin film actuated mirror array in an optical projection system according to a first embodiment of the present invention, FIG. 5 is a perspective view for showing the thin film actuated mirror array in an optical projection system in FIG. 4, FIG. 6 is a cross-sectional view taken along the line $A_1$–$A_2$ of FIG. 5, and FIG. 7 is a cross-sectional view taken along the line $B_1$–$B_2$ of FIG. 5.

Referring to FIGS. 4 and 5, the thin film AMA in an optical projection system according to the present embodiment has a substrate 100, an actuator 200 formed on the substrate 100, and a reflecting member 190 formed on the actuator 200.

Referring to FIG. 6, the substrate 100 has an electrical wiring 105, a first metal layer 115 formed the electrical wiring 105, a first passivation layer 120 formed on the electrical wiring 105 and on the first metal layer 115, a second metal layer 125 formed on the first passivation layer 120, a second passivation layer 130 formed on the second metal layer 125, and an etch stop layer 140 formed on the second passivation layer 130. The electrical wiring 105 receives a first signal from outside and transmits the first signal. Preferably, the electrical wiring 105 has a metal oxide semiconductor (MOS) transistor for switching operation. The first metal layer 115 includes a connecting terminal 110 which is connected to the electrical wiring 105. The connecting terminal 110 transmits the first signal to the actuator 200. The first passivation layer 120 protects the substrate 100 having the electrical wiring 105 and the connecting terminal 110. The second passivation layer 130 protects the second metal layer 125. The etch stop layer 140 prevents the second passivation layer 130 from etching during subsequent etching steps. The second metal layer 125 has a first adhesion layer 126 formed by using titanium and a first barrier layer 127 formed by using titanium nitride. A first opening 128 is formed in the second metal layer 125 where the connecting terminal 110 is formed. The first opening 128 insulates the second metal layer 125 from a bottom electrode 155 and a top electrode 165.

The actuator 200 has a supporting layer 150 having a first portion attached to a portion of the etch stop layer 140 having the connecting terminal 110 thereunder and a second portion parallelly formed above the etch stop layer 140, a bottom electrode 155 formed on the supporting layer 150, an active layer 160 formed on the bottom electrode 155, a top electrode 165 formed on the active layer 160, a common electrode 166 formed on a portion of the first portion of the supporting layer 150, and a post 185 formed on a portion of the top electrode 165. An air gap 195 is interposed between the etch stop layer 140 and the second portion of the supporting layer 150. The common electrode 166 is connected to the top electrode 165. The reflecting member 190 is supported by the post 185 so that the reflecting member 190 is parallelly formed above the top electrode 165.

Referring to FIG. 7, the actuator 200 further has a via contact 175 formed in a via hole 170 and a connecting member 176 formed from the via contact 175 to the bottom electrode 155. The via hole 170 is formed from a portion of the first portion of the supporting layer 150 to the connecting terminal 110. The bottom electrode 155 is connected to the via contact 175 via the connecting member 176. Therefore, the first signal, that is a picture current signal, is applied to the bottom electrode 155 from outside through the electrical wiring 105, the connecting terminal 110, the via contact 175, and the connecting member 176. While, when a second signal, that is a bias current signal, is applied to the top electrode 165 from outside through the common line 166, an electric field is generated between the top electrode 165 and the bottom electrode 155. Thus, the active layer 160 formed between the top electrode 165 and the bottom electrode 155 is deformed by the electric field.

The supporting layer 150 has a T-shape and the bottom electrode 155 has a rectangular shape. The bottom electrode 155 is formed on a central portion of the supporting layer 150. The active layer 160 has a rectangular shape smaller than the bottom electrode 155 and the top electrode 165 has a rectangular shape smaller than the active layer 160.

A method for manufacturing the thin film AMA in an optical projection system according to the first embodiment of the present invention will be described as follows.

Figure 8A:
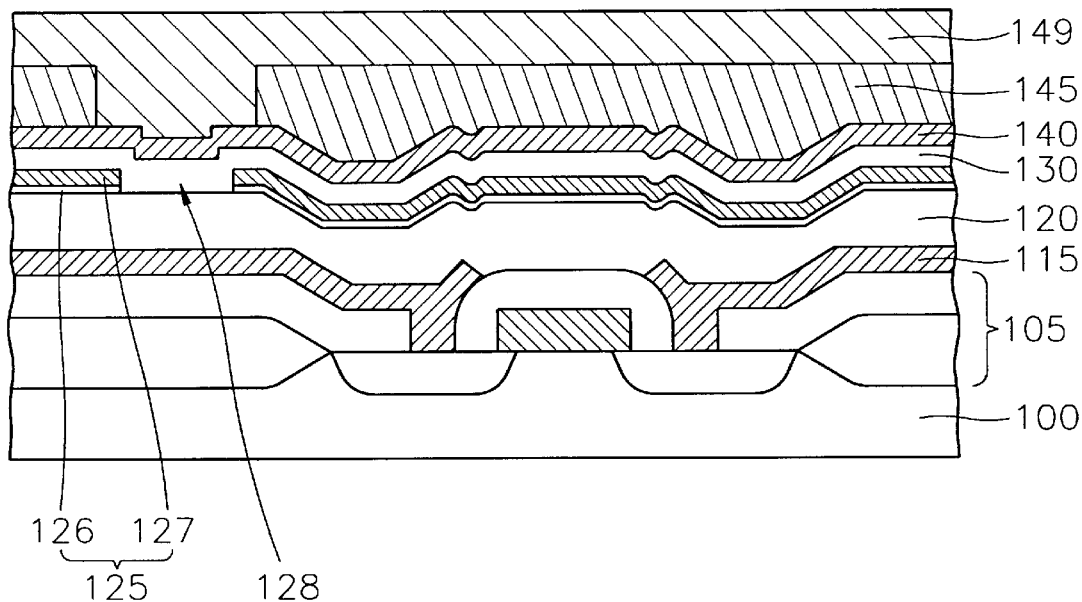
FIGS. 8A to 11B illustrate the manufacturing steps of the thin film actuated mirror array in an optical projection system according to the first embodiment of the present invention.
Figure 8B:
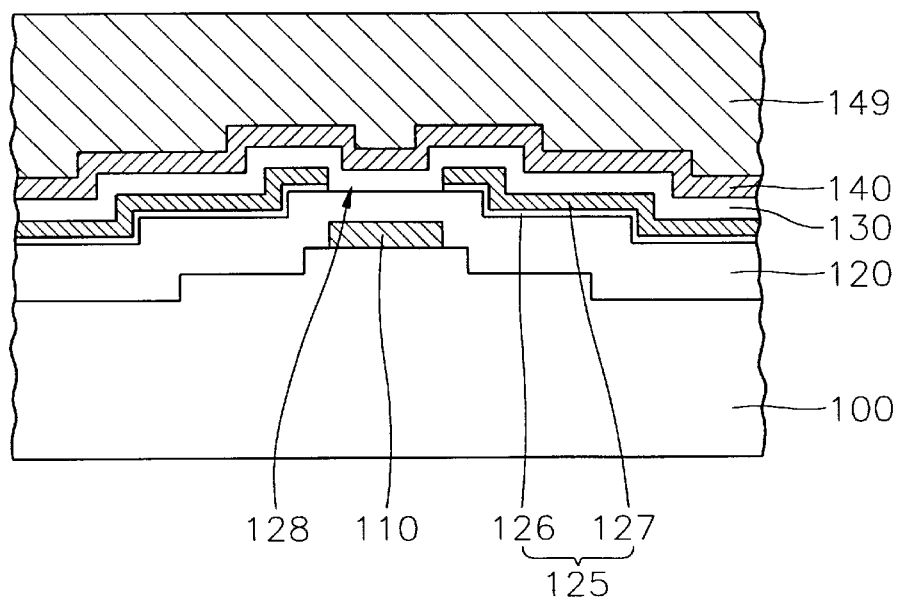

FIGS. 8A and 8B illustrate the states in which a first layer 149 is formed.

Referring to FIGS. 8A and 8B, the substrate 100 having the electrical wiring 105 and the connecting terminal 110 is provided. Preferably, the substrate 100 is composed of a semiconductor such as silicon (Si). The electrical wiring 105 receives the first signal (picture current signal) and transmits the first signal to the bottom electrode 155. Preferably, the electrical wiring 105 has MOS transistors for switching operation.

Then, titanium, titanium nitride, or tungsten are deposited on the electrical wiring 105 and substrate 100 and patterned to form the first metal layer 115. The first metal layer 115 has the connecting terminal 110 connected to the electrical wiring 105 and transmits the first signal to the bottom electrode 155.

The first passivation layer 120 is formed on the first metal layer 115 having the substrate 100 and the connecting terminal 110. The first passivation layer 120 is formed by using phosphor-silicate glass (PSG). The first passivation layer 120 is formed by a chemical vapor deposition (CVD) method so that the first passivation layer 120 has a thickness of between about 8000 Å and 9000 Å. The first passivation layer 120 protects the substrate 100 including the electrical wiring 105 and the connecting terminal 110 during subsequent manufacturing steps.

The second metal layer 125 is formed on the first passivation layer 120. To form the second metal layer 125, at first, the first adhesion layer 126 is formed by using titanium. The first adhesion layer 126 is formed by a sputtering method so that the first adhesior layer 126 has a thickness of between about 300 Å and 500 Å. Next, the first barrier layer 127 is formed by using titanium nitride on the first adhesion layer 126. The first barrier layer 127 is formed by a physical vapor deposition (PVD) method so that the first barrier layer 127 has a thickness of between about 1000 Å and 1200 Å. The second metal layer 125 excludes the light incident upon the substrate 100 so that the second metal layer 125 prevents a photo leakage current from flowing through the substrate 100. After that, a portion of the second metal layer 125 having the connecting terminal 110 thereunder is etched so as to form the first opening 128. The first opening 128 isolates the bottom electrode 155 and the top electrode 165 from the second metal layer 125.

The second passivation layer 130 is formed on the second metal layer 125 and on the first opening 128. The second passivation layer 130 is formed by using phosphor-silicate glass. The second passivation layer 130 is formed by a chemical vapor deposition method so that the second passivation layer 130 has a thickness of between about 2000 Å and 2500 Å. The second passivation layer 130 protects the second metal layer 125 during subsequent manufacturing steps.

The etch stop layer 140 is formed on the second passivation layer 130 by using nitride so that the etch stop layer 140 has a thickness of between about 1000 Å and 2000 Å. The etch stop layer 140 is formed by a low pressure chemical vapor deposition (LPCVD) method. The etch stop laser 140 protects the second passivation layer 130 during subsequent etching steps.

A first sacrificial layer 145 is formed on the etch stop layer 140 by using PSG so that the first sacrificial layer 145 has a thickness of between about 2.0 μm and 3.0 μm. The first sacrificial layer 145 enables the actuator 200 composed of the film layers to be easily formed. The first sacrificial layer 145 is removed by using a vapor of hydrogen fluoride when the actuator 200 is completely formed. The first sacrificial layer 145 is formed by an atmospheric pressure CVD (APCVD) method. In this case, the degree of flatness of the first sacrificial layer 145 is poor because the first sacrificial layer 145 covers the top of the substrate 100 saving the electrical wiring 105 and the connecting terminal 110. Therefore, the surface of the first sacrificial layer 145 is planarized by using a spin on glass (SOG) or by a chemical mechanical polishing (CMP) method. Preferably, the surface of the first sacrificial layer 145 is planarized by a CMP method.

After a portion of the first sacrificial layer 145 having the connecting terminal 110 formed thereunder is patterned along the column direction to Expose a portion of the etch stop layer 140, a first layer 149 is formed on the exposed portion of the etch stop layer 140 and on the first sacrificial layer 145. The first layer 149 is formed by using a rigid material, for example nitride or metal so that the first layer 149 has a thickness of between about 0.1 μm and 1.0 μm. When the first layer 149 is formed by an LPCVD method, the ratio of nitride gas is adjusted according to the reaction time to release the stress in the first layer 149. The first layer 149 will be patterned to form the supporting layer 150.

Figure 9A:
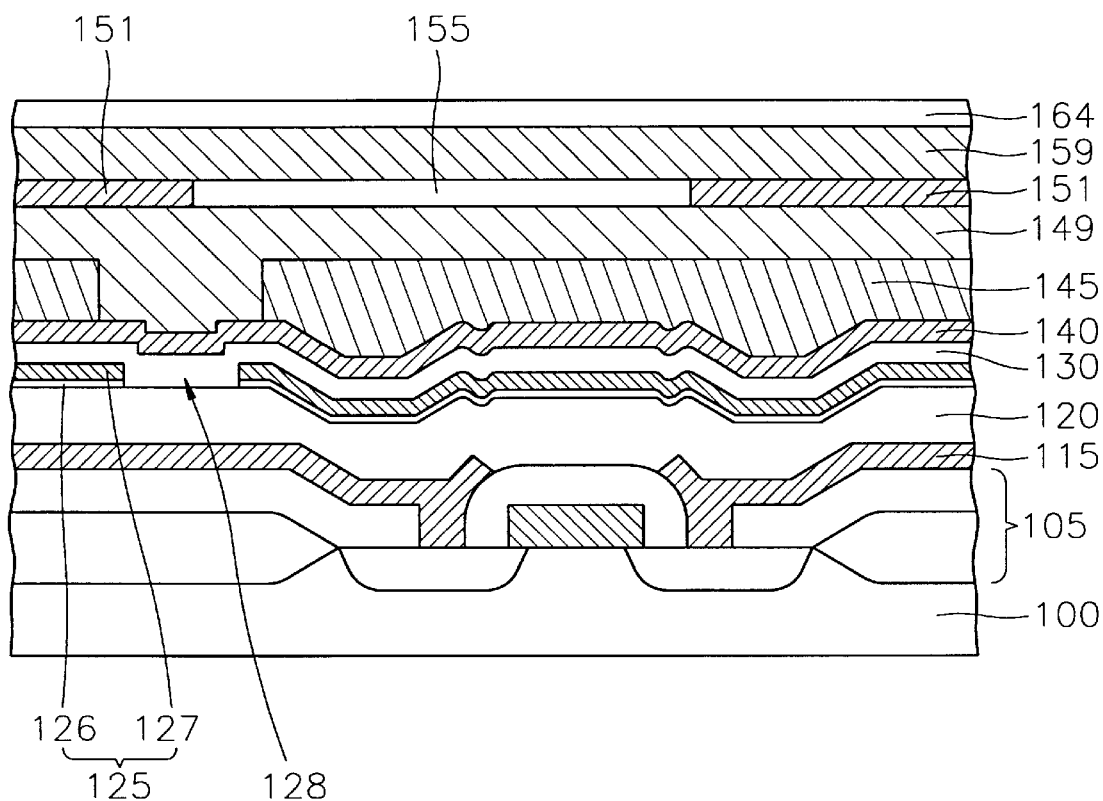
Figure 9B:
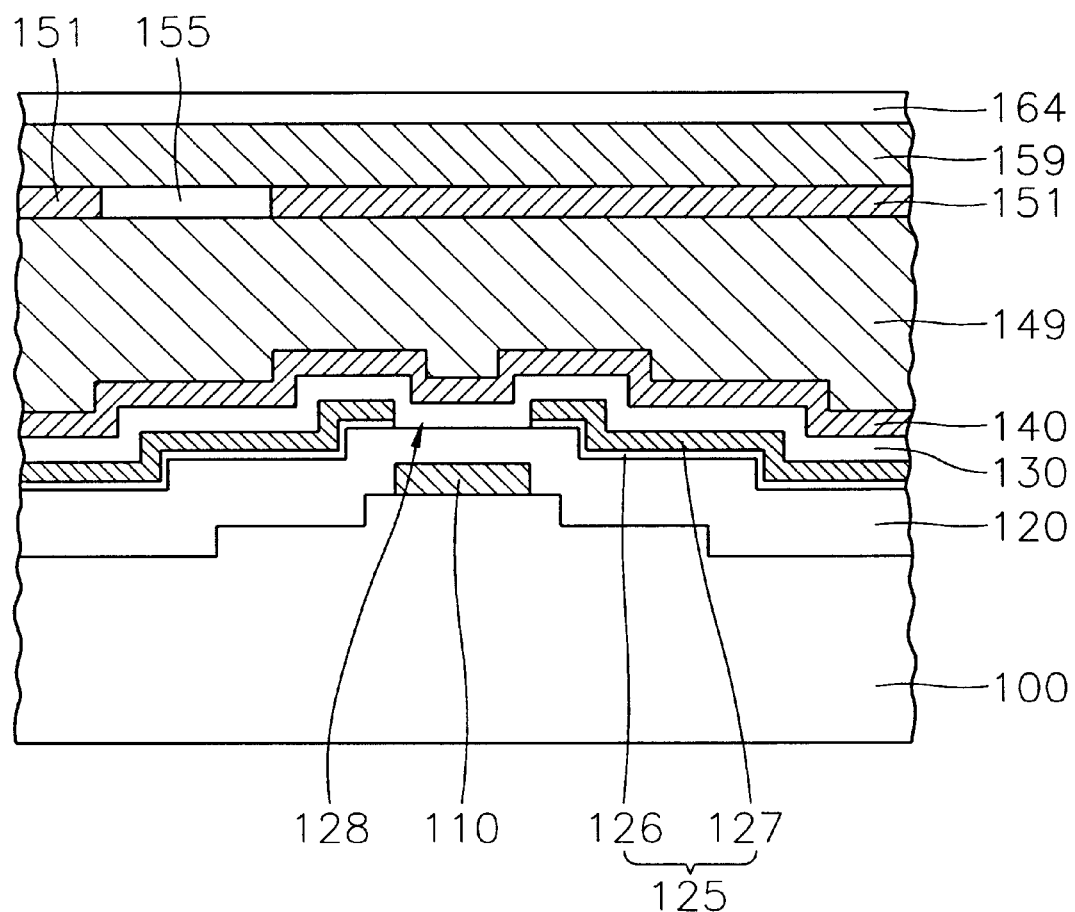

FIGS. 9A and 9B illustrate the states in which a top electrode layer 164 is formed.

Referring to FIGS. 9A and 9B, after a first photo-resist layer 151 is formed or the first layer 149 by a spin coating method, the first photo-resist layer 151 is patterned to expose a portion of the first layer 149 along the row direction. As a result, the portion of first layer 149 that is adjacent to the connecting terminal 110, is exposed as a rectangular shape. After a bottom electrode layer 154 is formed on the exposed portion of the first layer 149 and on the first photo-resist layer 151 by a sputtering method, the bottom electrode layer 154 is patterned to form the bottom electrode 155 on the exposed portion of the first layer 149 considering the position on which the common line 166 will be formed. So, the bottom electrode 155 has a rectangular shape. The bottom electrode 155 is formed by using an electrically conductive metal such as platinum (Pt), tantalum (Ta), or platinum-tantalum (Pt—Ta) so that the bottom electrode 155 has a thickness of between about 0.1 μm and 1.0 μm.

A second layer 159 is overlayed on the bottom electrode 155 and on the first photo-resist layer 151. The second layer 159 is formed by using a piezoelectric material such as PZT (Pb(Zr, Ti)O$_3$) or PLZT ((Pb, La) (Zr, Ti)O$_3$) so that the second layer 159 has a thickness of between about 0.1 μm and 0.1 μm. Preferably, the second layer 159 has a thickness of about 0.4 μm. Also, the second layer 159 is formed by using an electrostrictive material such as PMN (Pb(Mg, Nb)O$_3$). After the second layer 159 is formed by a Sol-Gel method, a sputtering method, or a CVD method, the second layer 159 is annealed by a Rapid Thermal Annealing (RTA) method. The second layer 159 will be patterned so as to form the active layer 160.

A top electrode layer 164 is overlayed on the second layer 159. The top electrode layer 164 is formed by using metal which has electrical conductivity, for example aluminum (Al), platinum, or tantalum (Ta). The top electrode layer 164 is formed by a sputtering method so that the top electrode layer 164 has a thickness of between about 0.1 μm and 1.0 μm. The top electrode layer 164 will be patterned so as to form the top electrode 165.

Figure 10A:
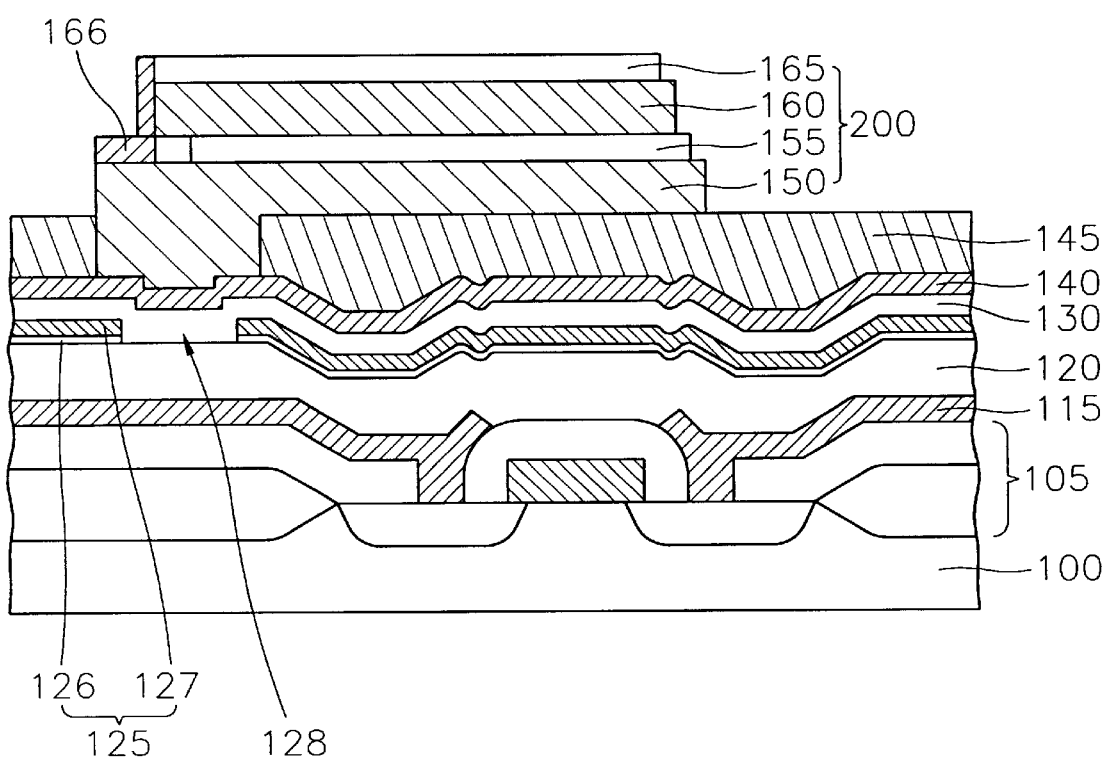
Figure 10B:
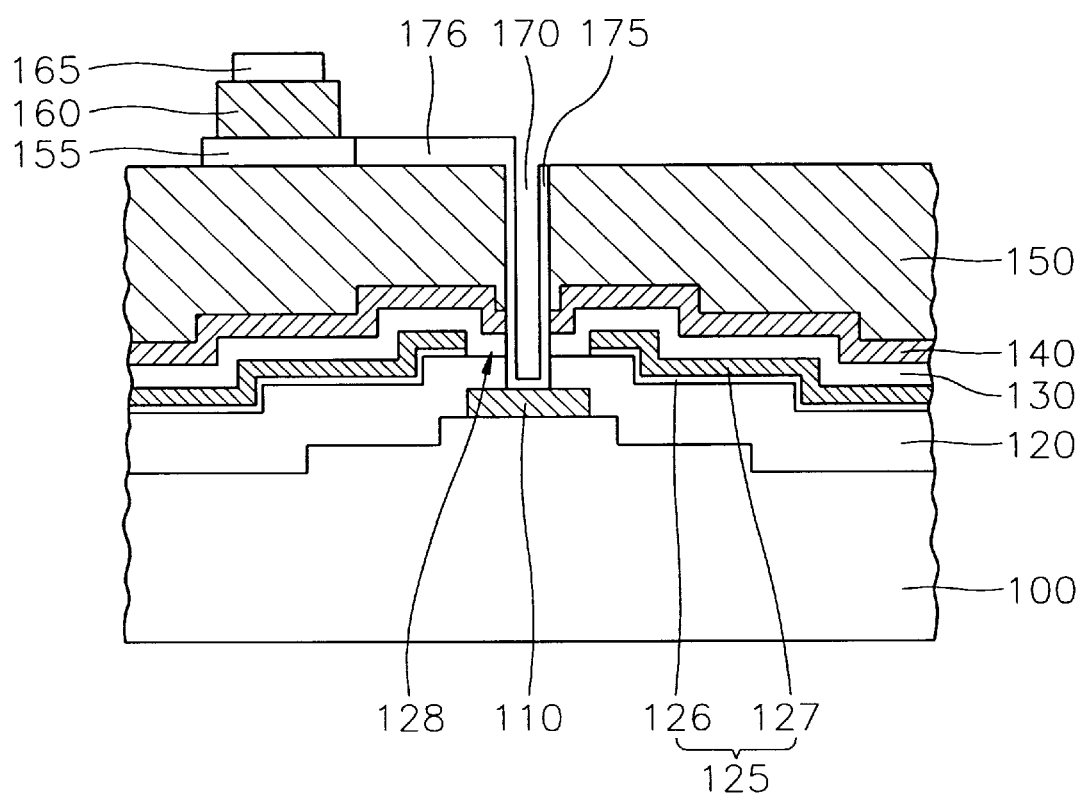

FIG. 10A illustrates a state that the actuator 200 is formed and FIG. 10B illustrates a state in which the via contact 175 is formed.

Referring to FIG. 10A, after a second photo resist (not shown) is coated on the top electrode layer 164 by a spin coating method, the top electrode layer 164 is patterned so as to form the top electrode 165 by using the second photo resist as an etching mask. The top electrode 165 has a rectangular shape. The second layer 159 is patterned so as to form the active layer 160 by using the same method as that of patterning the top electrode layer 164. That is, a third photo resist (not shown) is coated on the top electrode 165 and on the second layer 159 by a spin coating method after tie second photo resist is removed by etching. The second layer 159 is patterned so as to form the active layer 160 by using the third photo resist as an etching mask. The active layer 160 has a rectangular shape that is wider than that of the top electrode 165. At this time, the active layer 160 has a smaller size than that of the bottom electrode 155 formed previously.

The first layer 149 is patterned so as to form the supporting layer 150 by the above-described method. The supporting layer 150 has a T-shape unlike the shape of the bottom electrode 155. The bottom electrode 155 is formed on the central portion of the supporting layer 150.

The common line 166 is formed on the first portion of the supporting layer 150 after the first photo-resist layer 151 is removed. Namely, after a fourth photo resist layer (not shown) is coated on the supporting layer 150 by a spin coating method and then the fourth photo resist is patterned to expose the first portion of the supporting layer 150, the common line 166 is formed on the exposed portion of the supporting layer 150 by using an electrically conductive metal such as platinum, tantalum, platinum-tantalum, aluminum, or silver. The common line 166 is formed by a sputtering method or a CVD method so that the common line 166 has a thickness of between about 0.5 μm and 2.0 μm. At that time, the common line 166 is separated from the bottom electrode 155 by a predetermined distance and is attached to the top electrode 165 and to the active layer 160. As it is described above, a voltage drop of the second signal can be minimized when the second signal passes the common line 160 because the common line 166 is thick, so its internal resistance is decreased. Thereby, a sufficient second signal is applied to the top electrode 165 through the common line 166, so a sufficient electric field is generated between the top electrode 165 and the bottom electrode 155.

Referring to FIG. 10B, a portion of the first portion of the supporting layer 150 having the connecting terminal 110 thereunder is exposed when the fourth photo resist is patterned. Simultaneously, a portion which is adjacent to the portion of the first portion of the supporting layer 150 is exposed. The via hole 170 is formed from the portion of the first portion of the supporting layer 150 to the connecting terminal 110 through the etch stop layer 140, the second passivation layer 130 and the first passivation layer 120 by etching. The via contact 175 is formed in the via hole 170 from the connecting terminal 110 to the supporting layer 150. At the same time, the connecting member 176 is formed on the portion which is adjacent to the portion of the first portion of the supporting layer 150 from the bottom electrode 155 to the via contact 175. Thus, the via contact 175, the connecting member 176, and the bottom electrode 155 are connected one after another. The via contact 175 and the connecting member 176 are formed by a sputtering method or a CVD method. The via contact 175 and the connecting member 176 are formed by using an electrically conductive metal such as platinum, tantalum, or platinum-tantalum. The connecting member 176 has a thickness of between about 0.5 μm and 1.0 μm. Thereby, a voltage drop of the first signal can be minimized when the first signal passes the connecting member 176 because the connecting member 176 is thick, so its internal resistance is decreased. The actuator 200 having the top electrode 165, the active layer 160, the bottom electrode 155, and the supporting layer 150, is completed after the fourth photo resist is removed by etching.

Figure 11A:
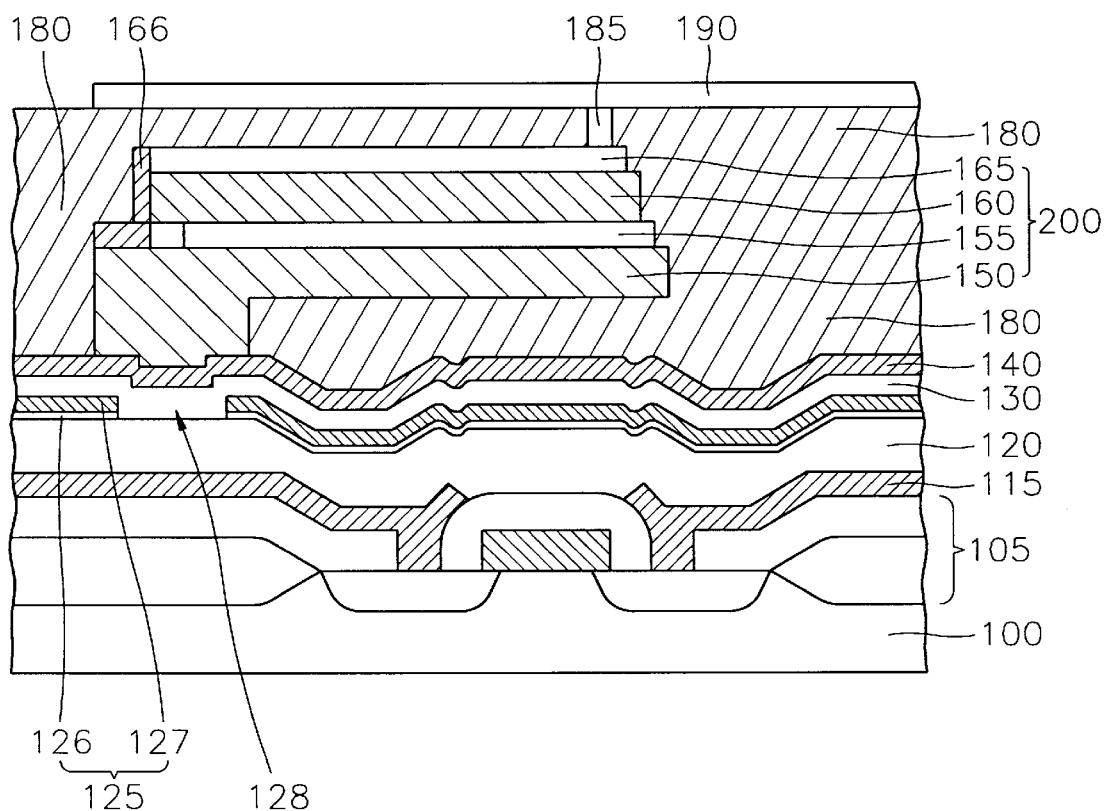
Figure 11B:
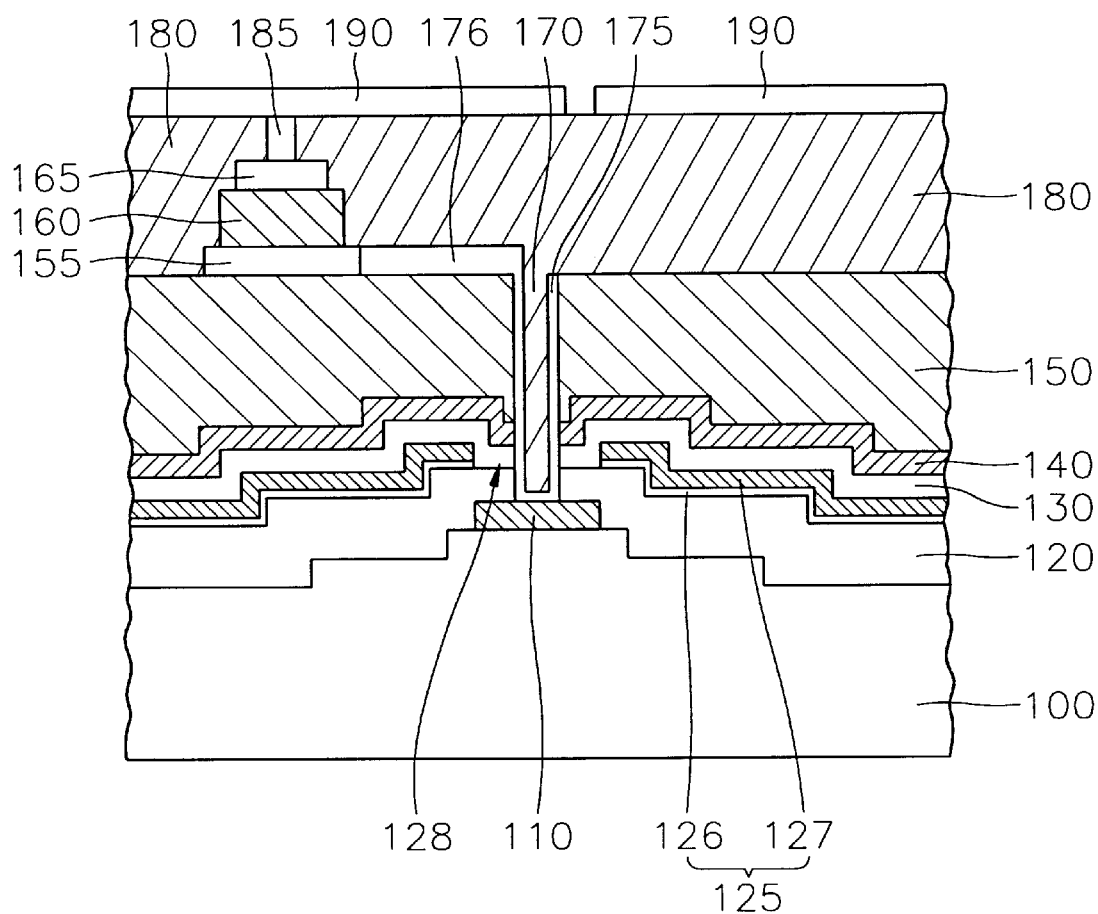

FIGS. 11A and 11B illustrate the states that the reflecting member 190 is formed.

Referring to FIGS. 11A and 11B, the first sacrificial layer 145 is removed by using a vapor of hydrogen fluoride (HF), a second sacrificial layer 180 is formed on the actuator 200 by using a polymer. The second sacrificial layer 180 is formed by a spin coating method so that the second sacrificial layer 180 completely covers the top electrode 165. Subsequently, the second sacrificial layer 180 is patterned to expose a portion of the top electrode 165. The post 185 is formed on the exposed portion of the top electrode 165 and the reflecting member 190 is formed on the post 185 and on the second sacrificial layer 180. The post 185 and the reflecting member 190 are simultaneously formed by using a reflective metal such as aluminum, platinum, or silver. The post 185 and the reflecting member 190 are formed by a sputtering method or a CVD method. Preferably, the reflecting member 190 for reflecting a light incident from a light source (not shown) is a mirror and has a thickness of between about 0.1 μm and 1.0 μm. The reflecting member 190 has a shape of rectangular plate to cover the top electrode 165. As it is described above, the flatness of the reflecting member 190 may be enhanced because the reflecting member 190 is formed on the second sacrificial layer 180. The actuator 200 which the reflecting member 190 is formed thereon is completed as shown in FIGS. 6 and 7 after the second sacrificial layer 180 is removed by etching.

The operation of the thin film AMA in an optical projection system according to the first embodiment of the present invention will be described.

In the thin film AMA according to the present embodiment, the first signal (picture current signal) is applied to the bottom electrode 155 via the electrical wiring 105, the connecting terminal 110, the via contact 175, and the connecting member 176. Meanwhile, the second signal (bias current signal) is applied to the top electrode 165 via the common line 166. Thus, an electric field is generated between the top electrode 165 and the bottom electrode 155. The active layer 160 formed between the top electrode 165 and the bottom electrode 155 is deformed by the electric field. The active layer 160 is deformed in a direction perpendicular to the electric field. The active layer 160 actuates in the direction opponent to the supporting layer 150. That is, the actuator 200 having the active layer 160 is actuated upward by a predetermined tilting angle.

The reflecting member 190 for reflecting the light incident from the light source is tilted with the actuator 200 because the reflecting member 190 is supported by the post 185 and is formed on the actuator 200. Hence, the reflecting member 190 reflects the incident light by a predetermined tilting angle, so the picture is projected onto the screen.

Therefore, in the thin film actuated mirror array in an optical projection system according to the present embodiment, a light incident from the light source can be excluded by means of the second metal layer. Therefore, before the first signal and the second signal are respectively applied to the bottom electrode and the top electrode, a mis-operation of the actuator due to the photo leakage current caused by the incident light can be prevented.

Embodiment 2

Figure 12A:
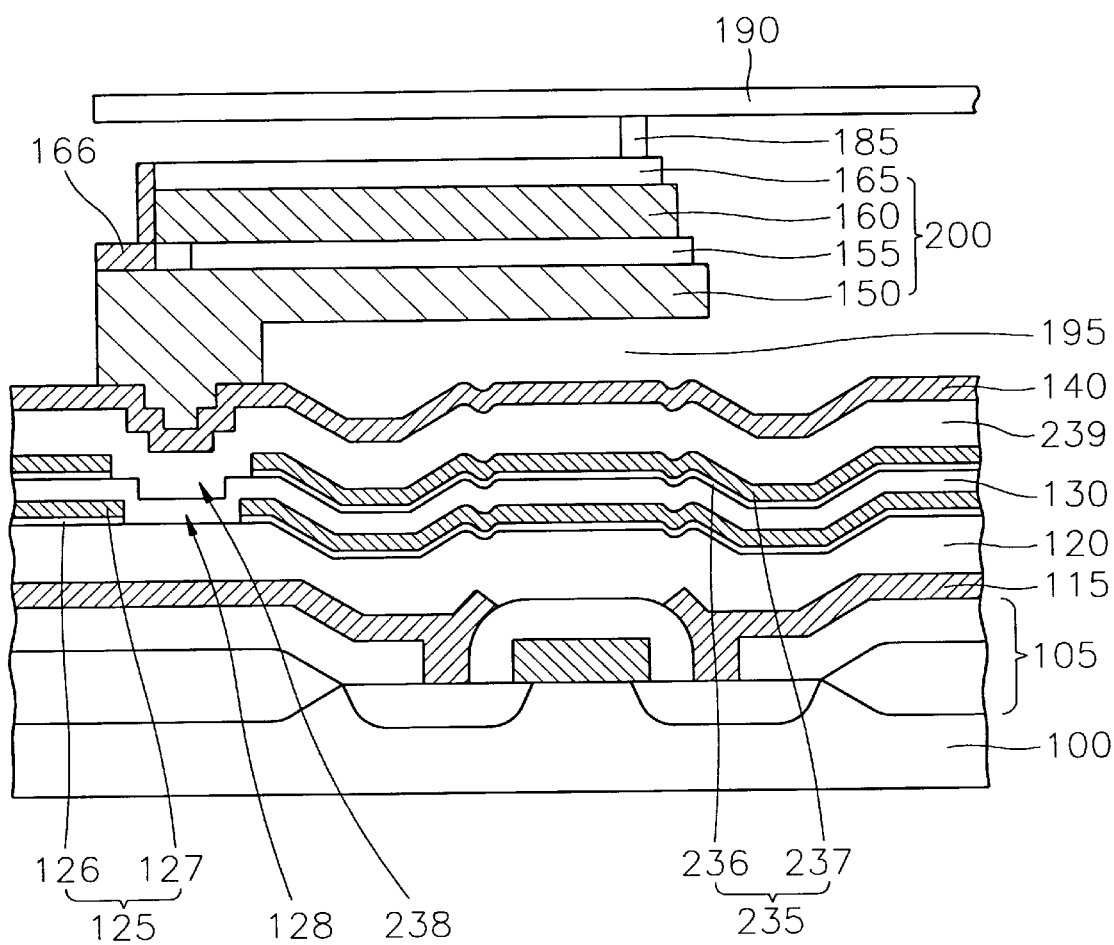
FIGS. 12A and 12B are a cross-sectional views of the thin film actuated mirror array in an optical projection system according to the second embodiment of the present invention.
Figure 12B:
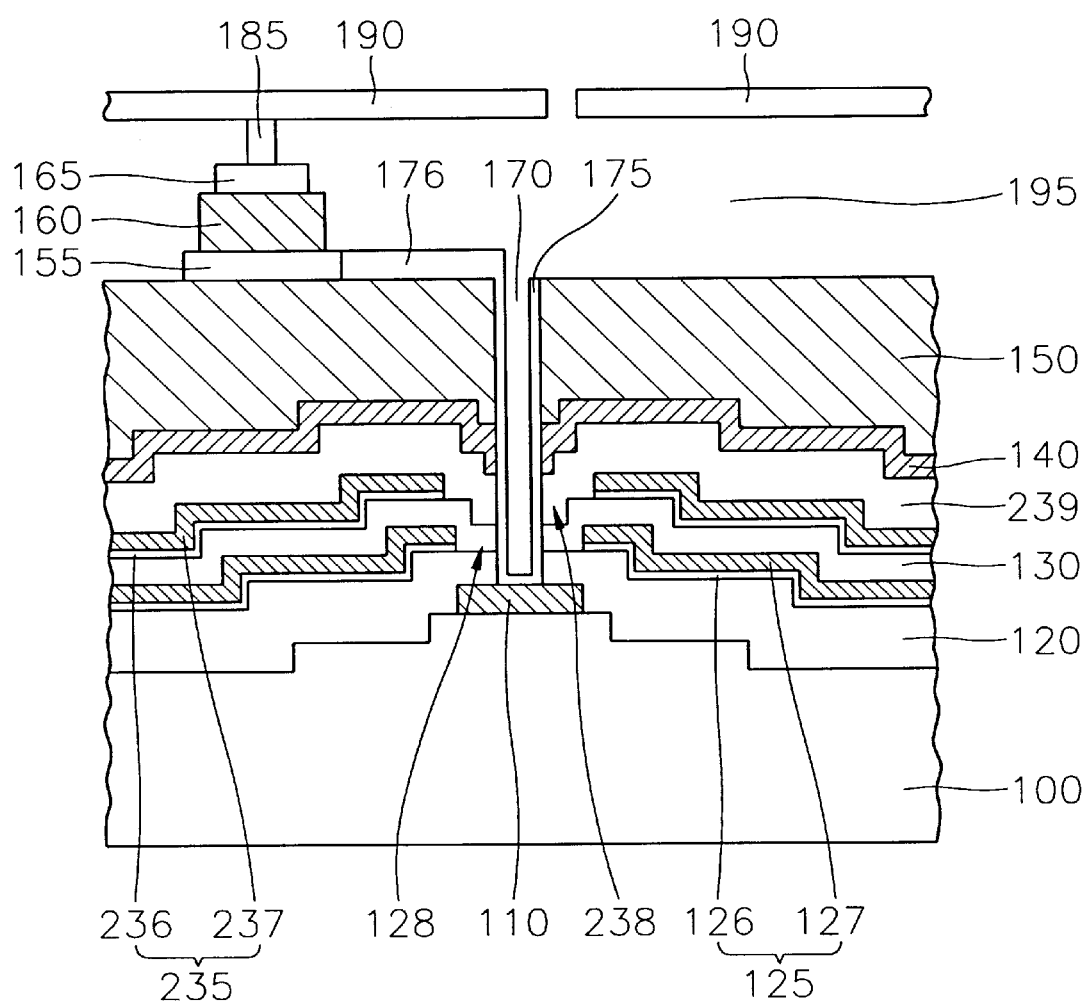

FIGS. 12A and 12B are a cross-sectional views of the thin film actuated mirror array in an optical projection system according to the second embodiment of the present invention.

Referring to FIGS. 12A and 12B, the thin film AMA in an optical projection system according to the present embodiment has a substrate 100, an actuator 200 formed on the substrate 100, and a reflecting member 190 formed on a portion of the actuator 200.

The thin film actuated mirror array according to the second embodiment of the present invention has the same structural elements and the same shapes as those of the first embodiment of the present invention shown in FIGS. 6 and 7, except that a third metal layer 235 primarily excluding a light incident upon the substrate 100 and a third passivation layer 239 for protecting the third metal layer 235 are further formed between the second passivation layer 130 and the etch stop layer 140. In the second embodiment of the present invention, the same reference numbers are used for the same elements in the first embodiment of the present invention.

Hereinafter, the manufacturing method of the thin film AMA according to the present embodiment will be explained.

Figure 13A:
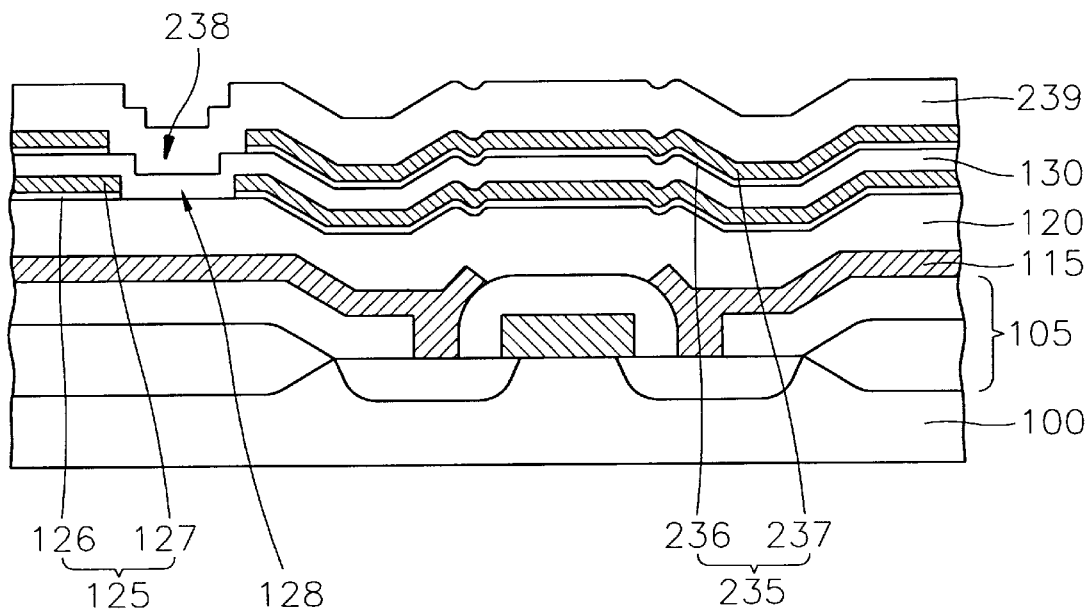
FIGS. 13A and 13B illustrate the manufacturing steps of the thin film actuated mirror array in an optical projection system according to the second embodiment of the present invention.
Figure 13B:
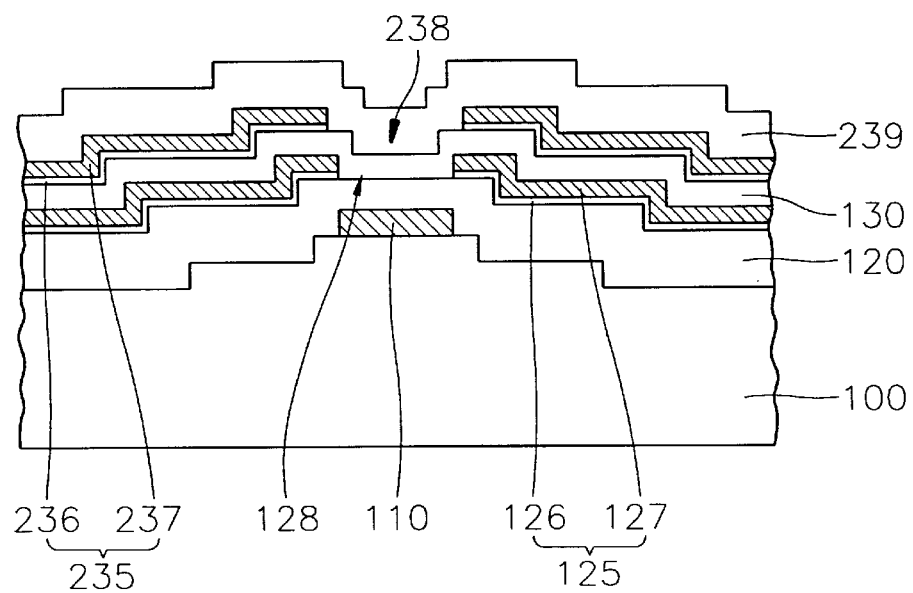

FIGS. 13A and 13B illustrate the manufacturing steps of the thin film actuated mirror array in an optical projection system according to the second embodiment of the present invention. In the present embodiment, the steps until the second passivation layer 130 is formed are the same as those of the first embodiment of the present invention shown in FIGS. 8A and 8B.

Referring to FIG. 13A and 13B, the substrate 100 having the electrical wiring 105 and the connecting terminal 110, is provided. Preferably, the substrate 100 is composed of a semiconductor such as silicon (Si). The electrical wiring 105 receives the first signal (picture current signal) and transmits the first signal to the bottom electrode 155. Preferably, the electrical wiring 105 has MOS transistors for switching operation.

Then, titanium, titanium nitride, or tungsten are deposited on the electrical wiring 105 and substrate 100 and patterned to form the first metal layer 115. The first metal layer 115 has the connecting terminal 110 which is connected to the electrical wiring 105 and transmits the first signal to the bottom electrode 155.

The first passivation layer 120 is formed on the first metal layer 115 having the substrate 100 and the connecting terminal 110. The first passivation layer 120 is formed by using phosphor-silicate glass (PSG). The first passivation layer 120 is formed by a chemical vapor deposition (CVD) method so that the first passivation layer 120 has a thickness of between about 8000 Å and 9000 Å. The first passivation layer 120 protects the substrate 100 including the electrical wiring 105 and the connecting terminal 110 during subsequent manufacturing steps.

The second metal layer 125 is formed on the first passivation layer 120. In order to form the second metal layer 125, at first, the first adhesion layer 126 is formed by using titanium. The first adhesion layer 126 is formed by a sputtering method so that the first adhesion layer 126 has a thickness of between about 300 Å and 500 Å. Next, the first barrier layer 127 is formed by using titanium nitride. The first barrier layer 127 is formed by a PVD method so that the first barrier layer 127 has a thickness of between about 1000 Å and 1200 Å. The second metal layer 125 excludes the light projected to the substrate 100 so that the second metal layer 125 prevents a photo leakage current from flowing through the substrate 100. After that, a portion of the second metal layer 125 having the connecting terminal 110 formed thereunder is etched to form the first opening 128. The first opening 128 isolates the bottom electrode 155 and the top electrode 165 from the second metal layer 125.

The second passivation layer 130 is formed on the second metal layer 125 and on the first opening 128. The second passivation layer 130 is formed by using phosphor-silicate glass. The second passivation layer 130 is formed by a CVD method so that the second passivation layer 130 has a thickness of between about 2000 Å and 2500 Å. The second passivation layer 130 protects the second metal layer 125 during subsequent manufacturing steps.

The third metal layer 235 is formed on the second passivation layer 130. In order to form the third metal layer 235, at first, a second adhesion layer 236 is formed by using titanium. The second adhesion layer 236 is formed by a sputtering method so that the second adhesion layer 236 has a thickness of between about 300 Å and 500 Å. Then, a second barrier layer 237 is formed by using titanium nitride. The second barrier layer 237 is formed by a PVD method so that the second barrier layer 237 has a thickness of between about 1000 Å and 1200 Å. The third metal layer 235 excludes the light projected to the substrate 100 so that the third metal layer 235 primarily prevents a photo leakage current from flowing through the substrate 100. After that, a portion of the third metal layer 235 having the first opening 128 formed thereunder is etched to form the second opening 238. The second opening 238 isolates the bottom electrode 155 and the top electrode 165 from the third metal layer 235.

The third passivation layer 239 is formed on the third metal layer 235 and on the second opening 238. The third passivation layer 239 is formed by using phosphor-silicate glass. The third passivation layer 239 is formed by a CVD so that the third passivation layer 239 has a thickness of between about 6000 Å and 7000 Å. The third passivation layer 239 protects the third metal layer 235 during subsequent manufacturing steps.

In the second embodiment of the present invention, the following steps of the manufacturing and the operation of the thin film AMA are the same as those of the first embodiment of the present invention shown in FIGS. 9A to 11B.

According to the present embodiment of the present invention, a light incident from the light source can be primarily excluded by the third metal layer. Then the light transmitted through the third metal layer are also excluded over again by the second metal layer. Therefore, before the first signal and the second signal are respectively applied to the bottom electrode and the top electrode, the mis-operation of the actuator due to the photo leakage current caused by the incident light can be prevented.

Embodiment 3

Figure 14A:
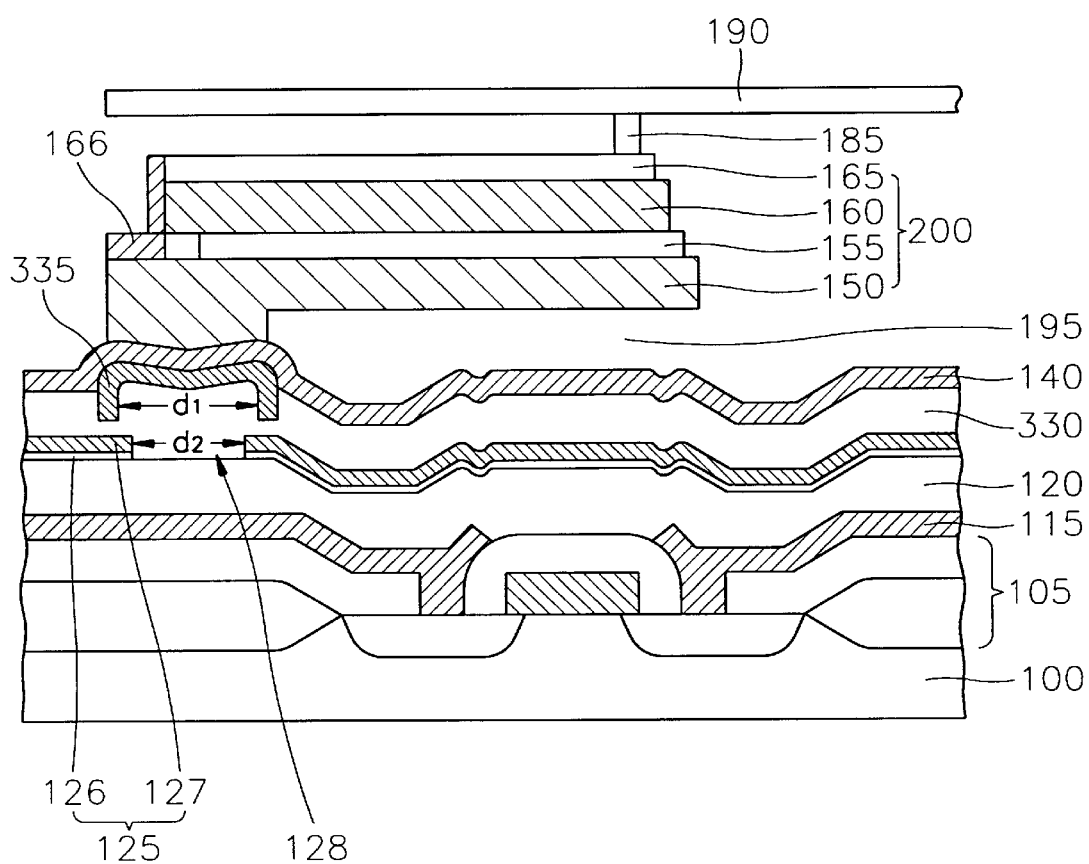
FIGS. 14A and 14B are a cross-sectional views of the thin film actuated mirror array in an optical projection system according to the third embodiment of the present invention.
Figure 14B:
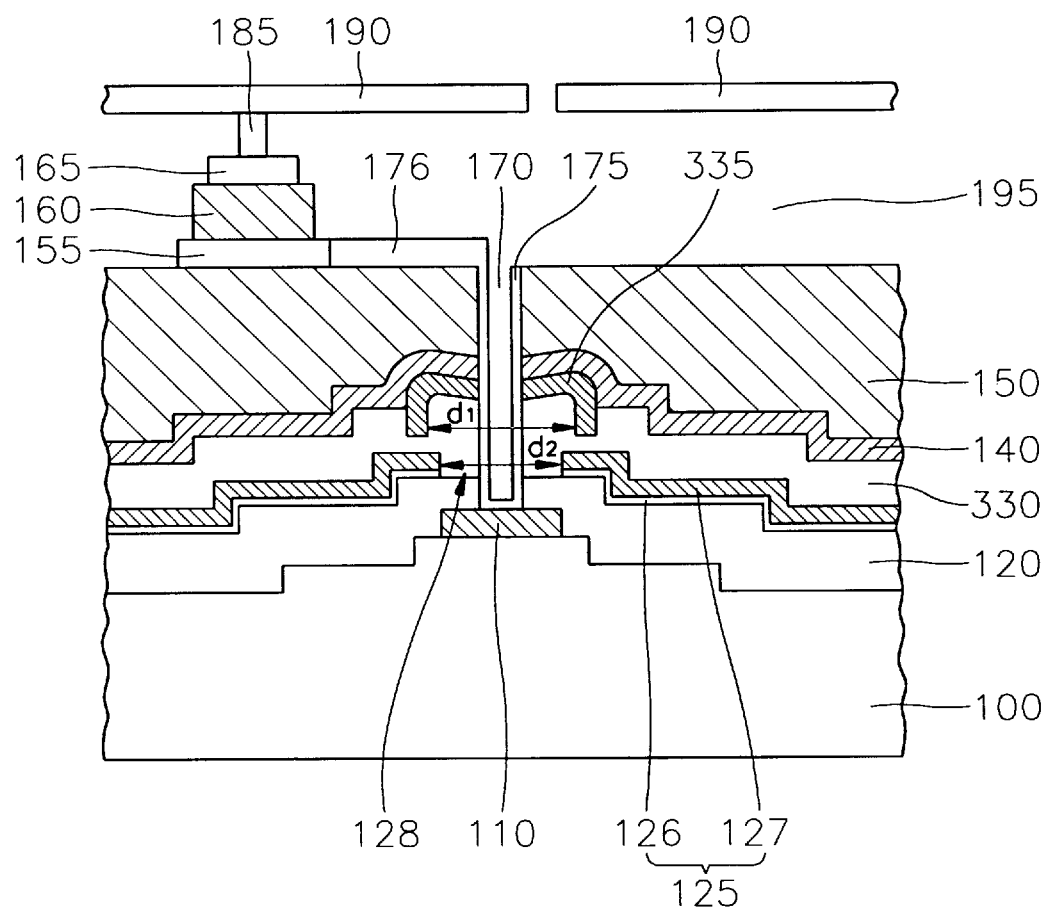

FIGS. 14A and 14B are a cross-sectional views of the thin film actuated mirror array in an optical projection system according to the third embodiment of the present invention.

Referring to FIGS. 14A and 14B, the thin film AMA in an optical projection system according to the present embodiment has a substrate 100, an actuator 200 formed on the substrate 100, and a reflecting member 190 formed on the actuator 200.

The thin film actuated mirror array according to the third embodiment of the present invention has the same structural elements and the same shapes as those of the second embodiment of the present invention shown in FIGS. 12A and 12B, except that the shape of a third metal layer 335 and the manufacturing method thereof differs from those of the second embodiment of the present invention. In the third embodiment of the present invention, the same reference numbers are used for the same elements in the second embodiment of the present invention.

Hereinafter, the manufacturing method of the thin film AMA according to the present embodiment will be explained.

Figure 15A:
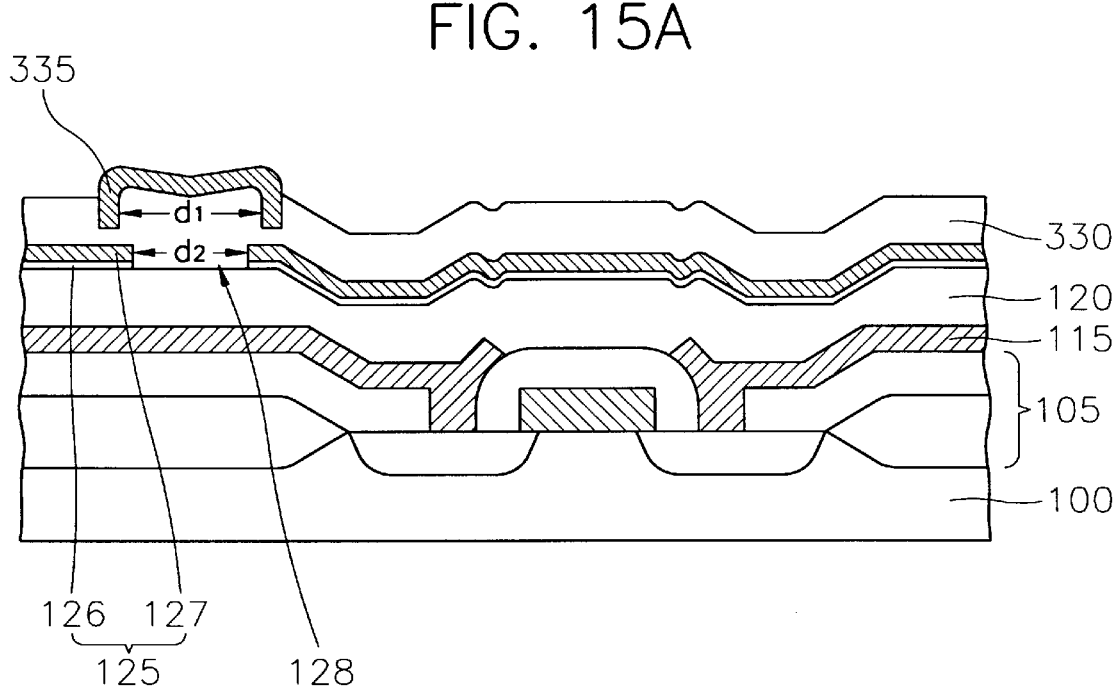
FIGS. 15A and 15B illustrate the manufacturing steps of the thin film actuated mirror array in an optical projection system according to the third embodiment of the present invention.
Figure 15B:
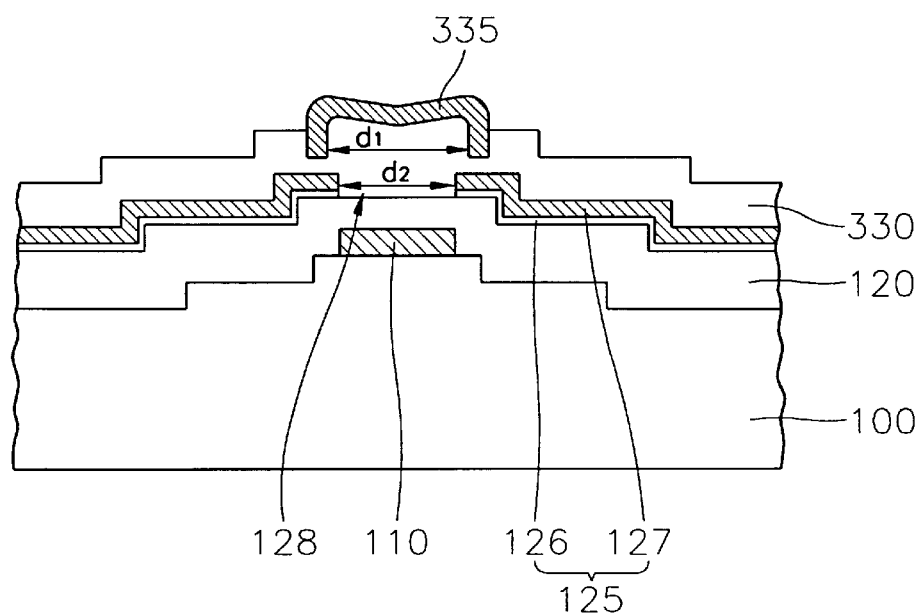

FIGS. 15A and 15B illustrate the manufacturing steps of the thin film actuated mirror array in an optical projection system according to the third embodiment of the present invention. In the present embodiment, the steps until the second passivation layer 130 is formed are the same as those of the first embodiment of the present invention shown in FIGS. 8A and 8B.

Referring to FIGS. 15A and 15B, the substrate 100 having the electrical wiring 105 and the connecting terminal 110, is provided. Preferably, the substrate 100 is composed of a semiconductor such as silicon (Si). The electrical wiring 105 receives the first signal (picture current signal) and transmits the first signal to the bottom electrode 155. Preferably, the electrical wiring 105 has MOS transistors for switching operation.

Then, titanium, titanium nitride, or tungsten are deposited on the electrical wiring 105 and substrate 100 and patterned to form the first metal layer 115. The first metal layer 115 has the connecting terminal 110 connected to the electrical wiring 105 and transmits the first signal to the bottom electrode 155.

The first passivation layer 120 is formed on the first metal layer 115 having the substrate 100 and the connecting terminal 110. The first passivation layer 120 is formed by using PSG. The first passivation layer 120 is formed by a CVD method so that the first passivation layer 120 has a thickness of between about 8000 Å and 9000 Å. The first passivation layer 120 protects the substrate 100 including the electrical wiring 105 and the connecting terminal 110 during subsequent manufacturing steps.

The second metal layer 125 is formed on the first passivation layer 120. In order to form the second metal layer 125, at first, the first adhesion layer 126 is formed by using titanium. The first adhesion layer 126 is formed by a sputtering method so that the first adhesion layer 126 has a thickness of between about 300 Å and 500 Å. Subsequently, the first barrier layer 127 is formed by using titanium nitride. The first barrier layer 127 is formed by a PVD method so that the first barrier layer 127 has a thickness of between about 1000 Å and 1200 Å. The second metal layer 125 excludes the light projected to the substrate 100 so that the second metal layer 125 prevents a photo leakage current from flowing through the substrate 100. After that, a portion of the second metal layer 125 having the connecting terminal 110 formed thereunder is etched to form the first opening 128. The first opening 128 isolates the bottom electrode 155 and the top electrode 165 from the second metal layer 125.

The second passivation layer 330 is formed on the second metal layer 125 and on the first opening 128. The second passivation layer 330 is formed by using PSG. The second passivation layer 330 is formed by a CVD so that the second passivation layer 330 has a thickness of between about 8000 Å and 9000 Å. The second passivation layer 330 protects the second metal layer 125 during subsequent manufacturing steps.

Subsequently, both sides of a portion of the second passivation layer 330 where the first opening 128 is formed are removed by a predetermined depth. As shown in FIGS. 15A and 15B, the horizontal distance ($d_1$) between the portions where the second passivation 330 is removed is larger than the diameter of the first opening 128 ($d_2$). When the second passivation layer 330 is removed, the second metal layer 125 does not be exposed. After that, the third metal layer 335 is formed on the second passivation layer 330 and the removed portions of the second passivation layer 330. The third metal layer 335 is formed by using aluminum or silver and by a sputtering method.

Then, the rest of the third metal layer 335, except the portions where the second passivation layer 330 is removed and where the third metal layer 335 covers the first opening 128, is removed. Preferably, the third metal layer 335 is formed as a shape of covering the first opening 128. The third metal layer 335 prevents an incident light from being incident upon the substrate 100 through the first opening 128.

In the third embodiment of the present invention, the following steps of the manufacturing and the operation of the thin film AMA are the same as those of the first embodiment of the present invention shown in FIGS. 9A to 11B.

According to the present embodiment of the present invention, a light incident from the light source can be prevented from being incident upon the substrate 100 by the second metal layer. Moreover, the transmitted light through the first opening 128 can be prevented from being incident upon the substrate 100 by the third metal layer 335. Therefore, before the first signal and the second signal are respectively applied to the bottom electrode and the top electrode, a mis-operation of the actuator due to the photo leakage current caused by the incident light can be prevented.

Besides, it has the advantage of reducing the manufacturing process because the third passivation layer 239 needs not be formed on the third metal layer 335.

Therefore, in the thin film actuated mirror array in an optical projection system according to the present invention, the light incident from the light source can be excluded by means of the second metal layer and the third metal layer. Therefore, before the first signal and the second signal are respectively applied to the bottom electrode and the top electrode, a misoperation of the actuator due to the photo leakage current caused by the incident light can be prevented.

Although preferred embodiments of the present invention have been described, it is understood that the present invention should not be limited to these preferred embodiments, but various changes and modifications can be made by one skilled in the art within the spirit and scope of the invention as hereinafter claimed.

What is claimed is:

1. A thin film actuated mirror array in an optical projection system being actuated by a first signal and a second signal, said thin film actuated mirror array in an optical projection system comprising:

a substrate having an electrical wiring for receiving a first signal from outside and transmitting the first signal;

a first metal layer formed on said substrate having a connecting terminal which is connected to said electrical wiring for transmitting the first signal;

a first passivation layer for protecting said substrate having said electrical wiring and said connecting terminal, said first passivation layer being formed on said electrical wiring and on said first metal layer;

a second metal layer formed on said first passivation layer for preventing a photo leakage current caused by a light incident from a light source, said second metal layer having a second passivation layer for protecting said second metal layer, said second passivation layer being formed on said second metal layer, and an etch stop layer for protecting said second passivation layer, said etch stop layer being formed on said second passivation layer, said second metal layer further including a first adhesion layer formed on said first passivation layer and a first barrier layer formed on said first adhesion layer;

an actuator comprising i) a supporting layer formed on said second metal layer, ii) a bottom electrode for receiving the first signal, said bottom electrode being formed on said supporting layer, iii) a top electrode corresponding to said bottom electrode for receiving the second signal and generating an electric field between said top electrode and said bottom electrode, and iv) an active layer formed between said top electrode and said bottom electrode and deformed by the electric field; and a reflecting means for reflecting the light, said reflecting means being formed on said actuator.

2. The thin film actuated mirror array in an optical projection system as claimed in claim 1, wherein said actuator has a common line for applying the second signal to said top electrode, said common line being formed on a portion of said actuator and being connected to said top electrode.

3. The thin film actuated mirror array in an optical projection system as claimed in claim 2, wherein said second passivation layer is formed by using a phosphor-silicate glass, said etch stop layer is formed by using a nitride, and said common line is formed by using an electrically conductive metal.

4. The thin film actuated mirror array in an optical projection system as claimed in claim 1, wherein said first adhesion layer is formed by using titanium and said first barrier layer is formed by using titanium nitride.

5. The thin film actuated mirror array in an optical projection system as claimed in claim 1, wherein a first opening is formed in a portion of said second metal layer having said connecting terminal formed thereunder.

6. The thin film actuated mirror array in an optical projection system as claimed in claim 1, said thin film actuated mirror array further comprising a third metal layer for preventing a photo leakage current caused by an incident light, said third metal layer being formed on said second metal layer.

7. The thin film actuated mirror array in an optical projection system as claimed in claim 6, said thin film actuated mirror array further comprising a third passivation layer for protecting said third metal layer, said third passivation layer being formed on said third metal layer.

8. The thin film actuated mirror array in an optical projection system as claimed in claim 6, said third metal layer further comprising a second adhesion layer formed on said second metal layer and a second barrier layer formed on said second adhesion layer.

9. The thin film actuated mirror array in an optical projection system as claimed in claim 8, wherein said second adhesion layer is formed by using titanium and said second barrier layer is formed by using titanium nitride.

10. The thin film actuated mirror array in an optical projection system as claimed in claim 6, wherein a second opening is formed in a portion of said third metal layer having said connecting terminal formed thereunder.

11. A thin film actuated mirror array in an optical projection system being actuated by a first signal and a second signal, said thin film actuated mirror array in an optical projection system comprising:

a substrate having an electrical wiring for receiving a first signal from outside and transmitting the first signal;

a first metal layer formed on said substrate having a connecting terminal which is connected to said electrical wiring for transmitting the first signal;

a first passivation layer for protecting said substrate having said electrical wiring and said connecting terminal, said first passivation layer formed on said electrical wiring and on said first metal layer;

a second metal layer formed on said first passivation layer for preventing a photo leakage current caused by a light incident from a light source, said second metal layer including a first adhesion layer formed on said first passivation layer and a first barrier layer formed on said first adhesion layer;

a second passivation layer formed on said second metal layer for protecting said second metal layer;

a third metal layer formed on said second passivation layer for preventing a photo leakage current caused by the light;

an actuator comprising i) a supporting layer formed on said second metal layer, ii) a bottom electrode for receiving the first signal, said bottom electrode being formed on said supporting layer, iii) a top electrode corresponding to said bottom electrode for receiving the second signal and generating an electric field between said top electrode and said bottom electrode, and iv) an active layer formed between said top electrode and said bottom electrode and deformed by the electric field; and a reflecting means for reflecting the light, said reflecting means being formed on said actuator.

12. The thin film actuated mirror array in an optical projection system as claimed in claim 11, said third metal layer further comprising a third passivation layer for protecting said third metal layer, said passivation layer being formed on said third metal layer, and an etch stop layer for protecting said third passivation layer, said etch stop layer being formed on said third passivation layer, and said actuator further comprising a common line for applying the second signal to said top electrode, said common line being formed on a portion of said actuator and being connected to said top electrode.

13. The thin film actuated mirror array in an optical projection system as in claim 11, wherein said first adhesion layer is formed on said first passivation layer by using titanium and said first barrier layer is formed on said first adhesion layer by using titanium nitride.

14. The thin film actuated mirror array in an optical projection system as claimed in claim 11, said third metal layer further comprising a second adhesion layer formed on said second passivation layer by using titanium and a second barrier layer formed on said second adhesion layer by using titanium nitride.

15. The thin film actuated mirror array in an optical projection system as claimed in claim 11, wherein a first opening is formed in a portion of said second metal layer having said connecting terminal formed thereunder and a second opening is formed in a portion of said third metal layer having said first opening formed thereunder.

16. The thin film actuated mirror array in an optical projection system as claimed in claim 11, wherein third metal layer is formed on a portion of said second passivation layer having said connecting terminal formed thereunder.

17. A method for manufacturing a thin film actuated mirror array in an optical projection system being actuated by a first signal and a second signal, said method comprising the steps of:

providing a substrate having an electrical wiring for receiving the first signal from outside and transmitting the first signal;

forming a first metal layer on said substrate, said first metal layer having a connecting terminal which is connected to said electrical wiring for transmitting the first signal;

forming a first passivation layer on said electrical wiring and on said first metal layer;

forming a second metal layer on said first passivation layer for preventing a photo leakage current caused by a light incident from a light source, said second metal layer including a first adhesion layer formed on said first passivation layer and a first barrier layer formed on said first adhesion layer;

forming a second passivation layer on said second metal layer for protecting said second metal layer;

forming an etch stop layer on said second passivation layer;

forming a first layer on said etch stop layer;

forming a bottom electrode layer on said first layer and patterning said bottom electrode layer to form a bottom electrode for receiving the first signal;

forming an actuator by patterning said top electrode layer to form a top electrode for receiving the second signal and generating an electric field, by patterning said second layer to form an active layer deformed by the electric field, and by patterning said first layer to form a supporting layer beneath said bottom electrode; and forming a reflecting means for reflecting the light on said actuator.

18. The method for manufacturing the thin film actuated mirror array to an optical projection system as claimed in claim 17, the step of forming said second metal layer further comprising the steps of forming the first adhesion layer on said first passivation layer by using titanium and by means of a sputtering method, and forming the first barrier layer on said first adhesion layer by using titanium nitride and by means of a physical vapor deposition method.

19. The method for manufacturing the thin film actuated mirror array in an optical projection system as claimed in claim 17, the step of forming said second metal layer further comprising the step of forming an opening by etching a portion of said second metal layer where said connecting terminal is formed.

* * * * *